US007065892B2

(12) United States Patent
Fleming et al.

(10) Patent No.: US 7,065,892 B2
(45) Date of Patent: Jun. 27, 2006

(54) METHOD AND APPARATUS FOR CALIBRATING A VISION SYSTEM TO A PARTS HANDLING DEVICE

(75) Inventors: Timothy J. Fleming, Apple Valley, MN (US); Jeffrey J. Hohn, Carver, MN (US); Christopher R. Holloman, Eden Prairie, MN (US); Steven E. Wheeler, Northfield, MN (US); Charles N. Miller, Apple Valley, MN (US)

(73) Assignee: Veeco Instruments Inc., Woodbury, NY (US)

( * ) Notice: Subject to any disclaimer, the term of this patent is extended or adjusted under 35 U.S.C. 154(b) by 357 days.

(21) Appl. No.: 10/102,515

(22) Filed: Mar. 19, 2002

(65) Prior Publication Data

US 2003/0059100 A1 Mar. 27, 2003

Related U.S. Application Data

(60) Provisional application No. 60/276,999, filed on Mar. 19, 2001.

(51) Int. Cl.
*G01B 21/04* (2006.01)
(52) U.S. Cl. .......................................... 33/502; 73/1.79
(58) Field of Classification Search .................. 33/502, 33/503; 73/1.79, 1.81; 382/141; 356/243.1
See application file for complete search history.

(56) References Cited

U.S. PATENT DOCUMENTS

| | | | |
|---|---|---|---|
| 2,676,414 A | 4/1954 | Derry | |
| 2,742,316 A | 4/1956 | Phillips | |
| 3,277,598 A | 10/1966 | Lightburn | |
| 4,079,253 A | 3/1978 | Gainer | |
| 4,132,318 A | 1/1979 | Wang et al. | |
| 4,534,050 A | 8/1985 | Smith | |
| 4,652,806 A | 3/1987 | Aiello | |
| 4,707,647 A * | 11/1987 | Coldren et al. | ............. 382/151 |
| 4,731,856 A * | 3/1988 | Lloyd et al. | ................ 382/141 |
| 4,738,370 A | 4/1988 | Urmston et al. | |
| 4,771,178 A | 9/1988 | Egle et al. | |
| 4,818,169 A | 4/1989 | Schram et al. | |

(Continued)

OTHER PUBLICATIONS

"Freedom 1000 Automated Alignment System," *Burleigh Instruments, Inc.*, http://www.burleigh.com/Pages/freedom.htm, 4 pages (Last Printed Aug. 23, 2000).

(Continued)

*Primary Examiner*—R. Alexander Smith
(74) *Attorney, Agent, or Firm*—Merchant & Gould P.C.

(57) ABSTRACT

A calibration method for calibrating a parts-handling device with respect to a computer vision camera includes the steps of moving a parts-handling device into contact with a touch-off block, and storing a value indicative of the position of the parts-handling device when it is in contact with the touch-off block. In addition, there may be two orthogonal surface on the touch-off block. By touching the parts-handling device against both surfaces, the parts-handling device can be calibrated for position offset in two orthogonal directions. For parts-handling devices that are rotatable, the parts-handling device may be rotated to a succession of predetermined angular positions and brought into contact with the touch-off block in each position. By combining the measured positions of the parts-handling device in each rotational position, the system can be calibrated to compensate for the offset from the camera to the parts-handling device as a function of rotational position as well.

9 Claims, 28 Drawing Sheets

U.S. PATENT DOCUMENTS

| | | | | |
|---|---|---|---|---|
| 4,876,728 A | * | 10/1989 | Roth | 382/153 |
| 4,925,308 A | * | 5/1990 | Stern et al. | 356/614 |
| 4,932,131 A | * | 6/1990 | McMurtry et al. | 33/1 M |
| 4,934,671 A | | 6/1990 | Laninga et al. | |
| RE33,774 E | * | 12/1991 | Gurny | 33/503 |
| 5,189,799 A | | 3/1993 | Fairer et al. | |
| 5,301,003 A | | 4/1994 | Ikeda | |
| 5,400,638 A | * | 3/1995 | Kim | 73/1.79 |
| 5,579,444 A | * | 11/1996 | Dalziel et al. | 700/259 |
| 5,602,967 A | * | 2/1997 | Pryor | 700/259 |
| 5,615,489 A | * | 4/1997 | Breyer et al. | 33/503 |
| 5,731,641 A | | 3/1998 | Botos et al. | |
| 5,792,077 A | | 8/1998 | Gomes | |
| 5,825,666 A | * | 10/1998 | Freifeld | 702/153 |
| 5,886,494 A | | 3/1999 | Prentice et al. | |
| 5,906,863 A | | 5/1999 | Lombardi et al. | |
| 6,008,636 A | * | 12/1999 | Miller et al. | 324/158.1 |
| 6,077,026 A | | 6/2000 | Shultz | |
| 6,116,848 A | | 9/2000 | Thomas et al. | |
| 6,141,469 A | | 10/2000 | Kashyap | 385/27 |
| 6,169,828 B1 | * | 1/2001 | Cao | 385/31 |
| 6,246,789 B1 | * | 6/2001 | Hosotani et al. | 382/151 |
| 6,254,317 B1 | | 7/2001 | Chang | |
| 6,374,982 B1 | | 4/2002 | Cohen et al. | |
| 6,397,481 B1 | | 6/2002 | Alvarez et al. | |
| 6,442,851 B1 | | 9/2002 | Botos et al. | |
| 6,552,339 B1 | | 4/2003 | Gupta et al. | |
| 6,616,030 B1 | | 9/2003 | Miller | |
| 6,640,423 B1 | | 11/2003 | Johnson et al. | 29/740 |
| 6,651,351 B1 | * | 11/2003 | Christoph et al. | 33/503 |
| 6,681,151 B1 | * | 1/2004 | Weinzimmer et al. | 700/259 |
| 6,759,853 B1 | * | 7/2004 | Butler | 324/534 |
| 6,816,755 B1 | * | 11/2004 | Habibi et al. | 700/259 |
| 6,826,840 B1 | * | 12/2004 | Lindsey et al. | 33/18.1 |
| 6,876,761 B1 | * | 4/2005 | Okuda et al. | 382/151 |
| 2003/0223111 A1 | | 12/2003 | Lamvik et al. | |
| 2005/0123187 A1 | * | 6/2005 | Bushman et al. | 382/141 |
| 2005/0131582 A1 | * | 6/2005 | Kazi et al. | 700/259 |
| 2005/0174579 A1 | * | 8/2005 | Notni et al. | 356/601 |

OTHER PUBLICATIONS

"Freedom™ 1000 Automated Alignment System," *Burleigh Instruments, Inc.*, http://www.burleigh.com/Pages/freedompic.htm, 2 pages (Last Printed Aug. 23, 2000).

"Goniometer Heads," *STOE*, http://www.ccp14ac.uk/ccp/web-mirrors/commercial/stoe/products/goniometerheads_i.htm, 2 pages (Last Printed Aug. 21, 2000).

Nonius KappaCCD Page, *Nonius BV*, http://www.nonius.nl/products/sms/kappa/index.html, 2 pages (C 1998, 1999, 2000).

"Stoe Goniometerköpfe Gonimeter-Heads," *STOE & CIE GmbH*, 4 pages, date unknown.

The Nonius Eucentric Gonimeter Head Page, *Nonius BV*, http://www.nonius.nl/products/acces/gonio/eucent.html, 1 page (C 1998, 1999, 2000).

The Nonius X-Y-Z Goniometer Heads, *Nonius BV*, http://www.nonius.nl/products/acces/gonio/xyz.html, 1 page (Last Printed Aug. 22, 2000).

"TSE-150 Positioning System with Integral Encoder," *Burleigh Instruments, Inc.*, http://www.burleigh.com/Pages/tse.htm, 2 pages (Last Printed Aug. 23, 2000).

* cited by examiner

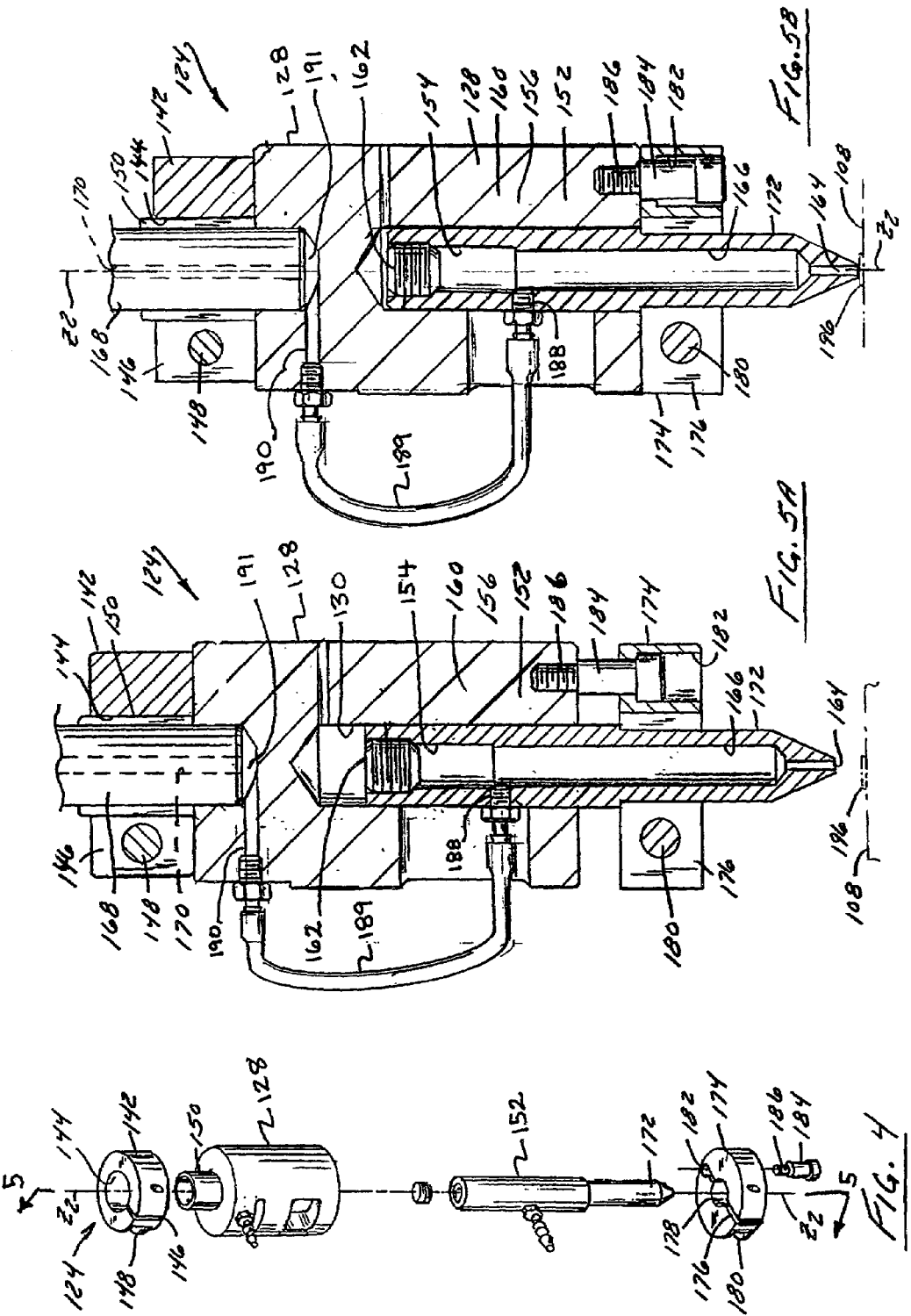

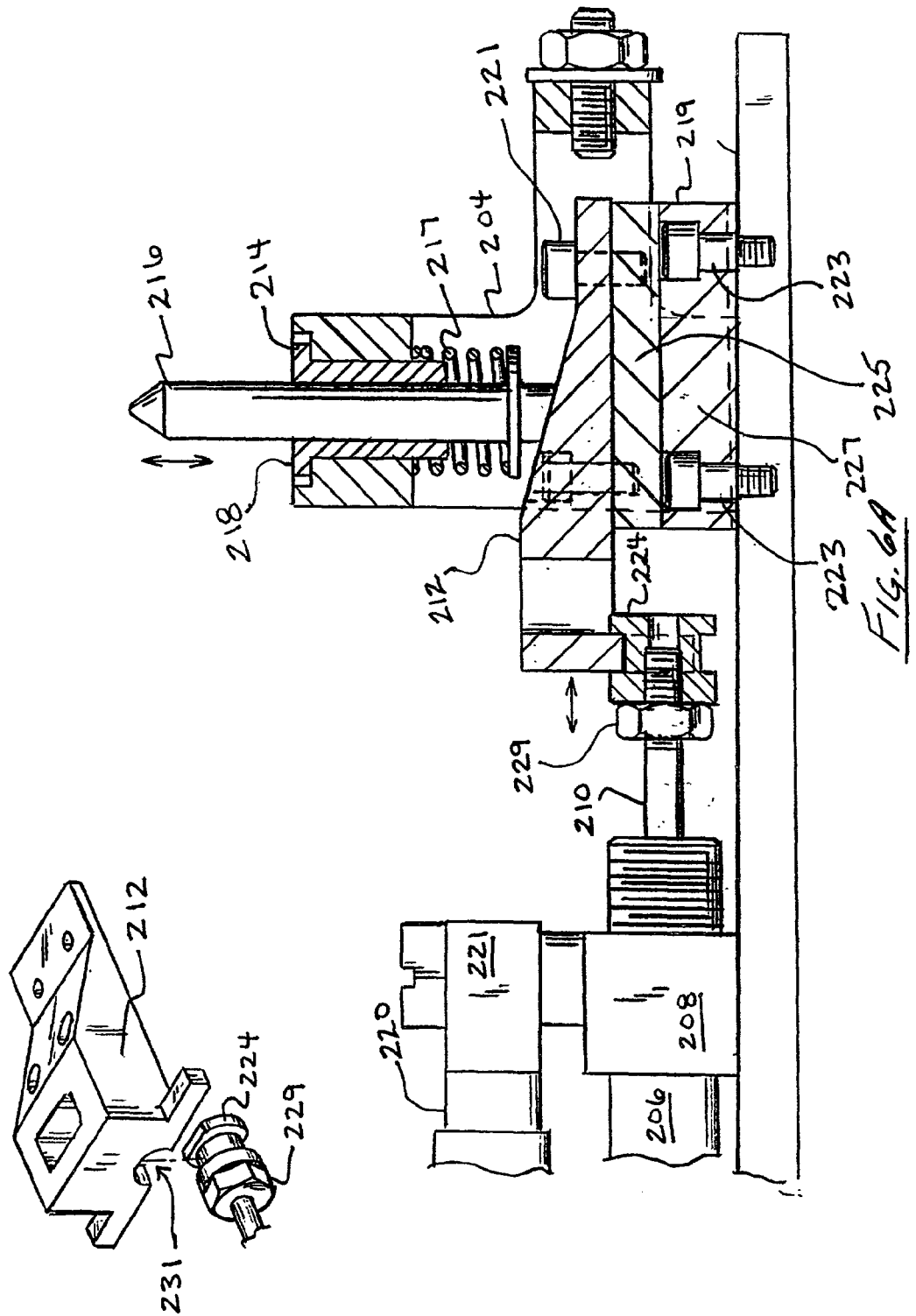

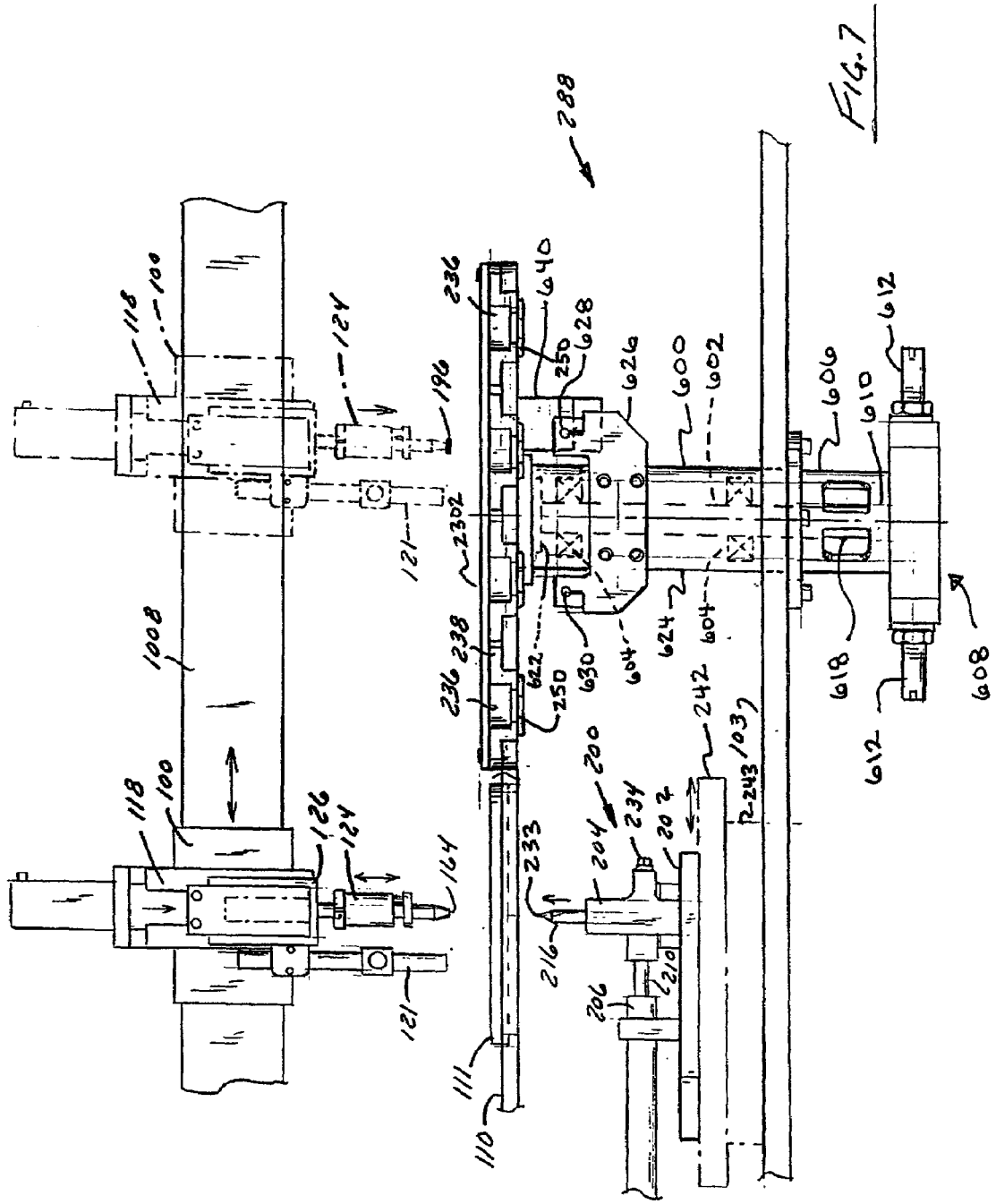

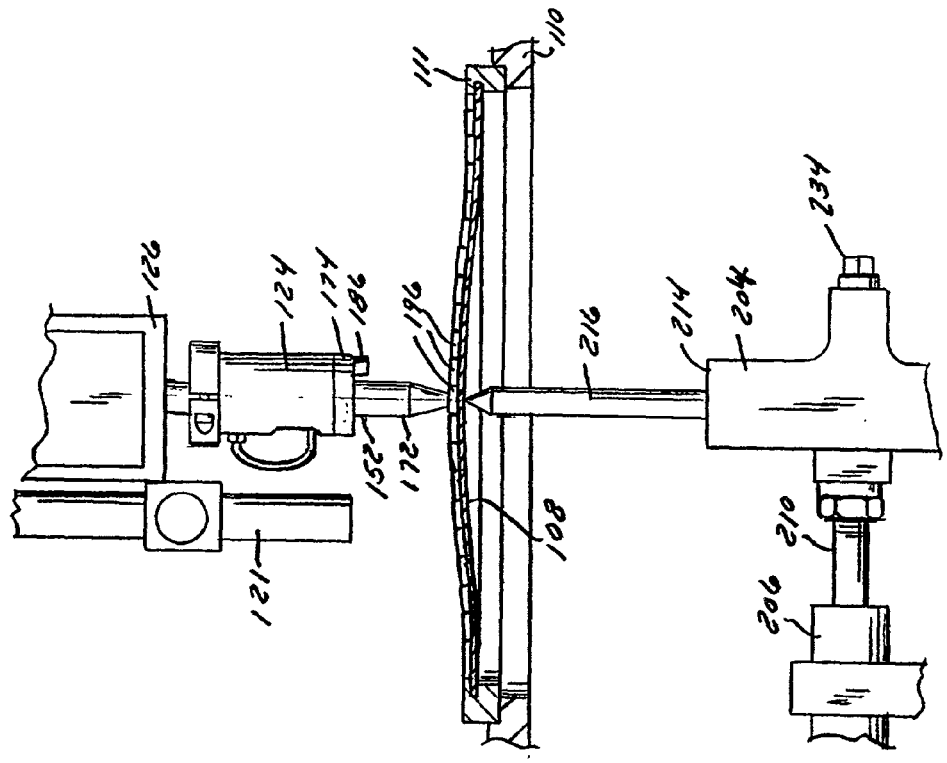
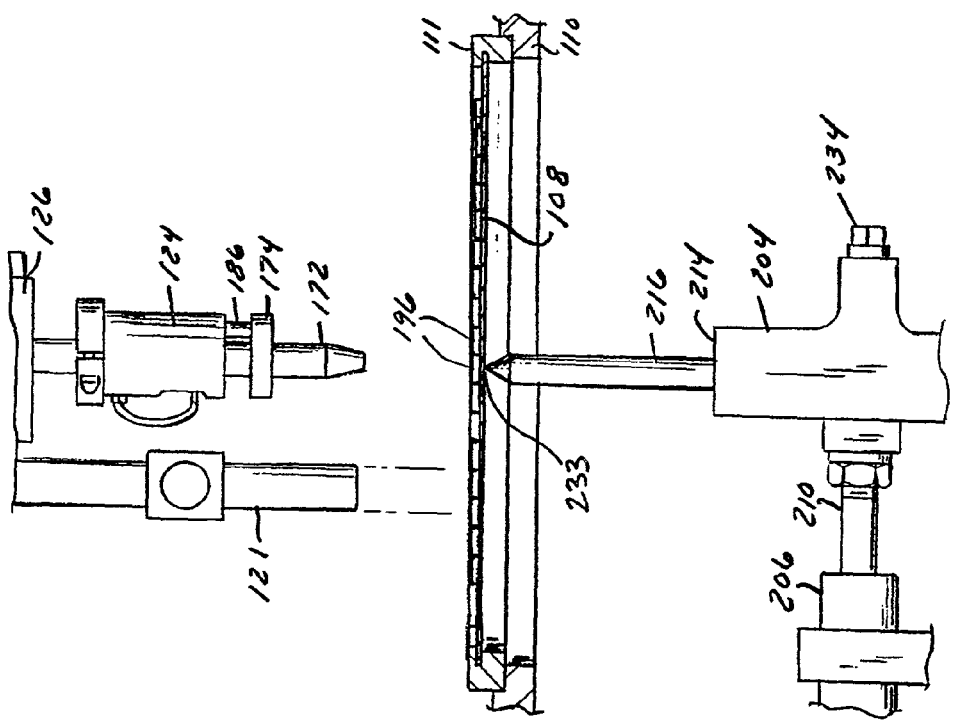

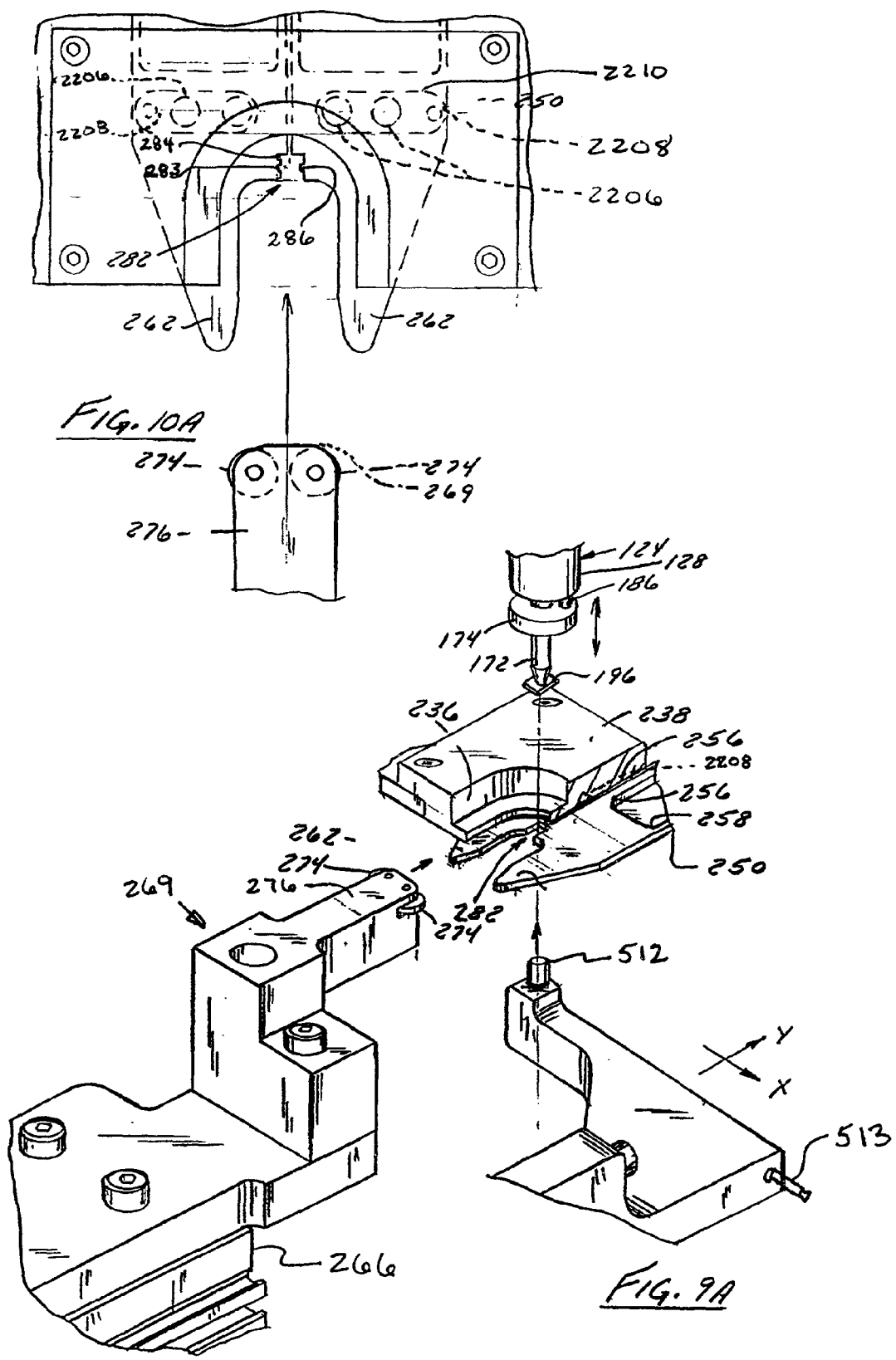

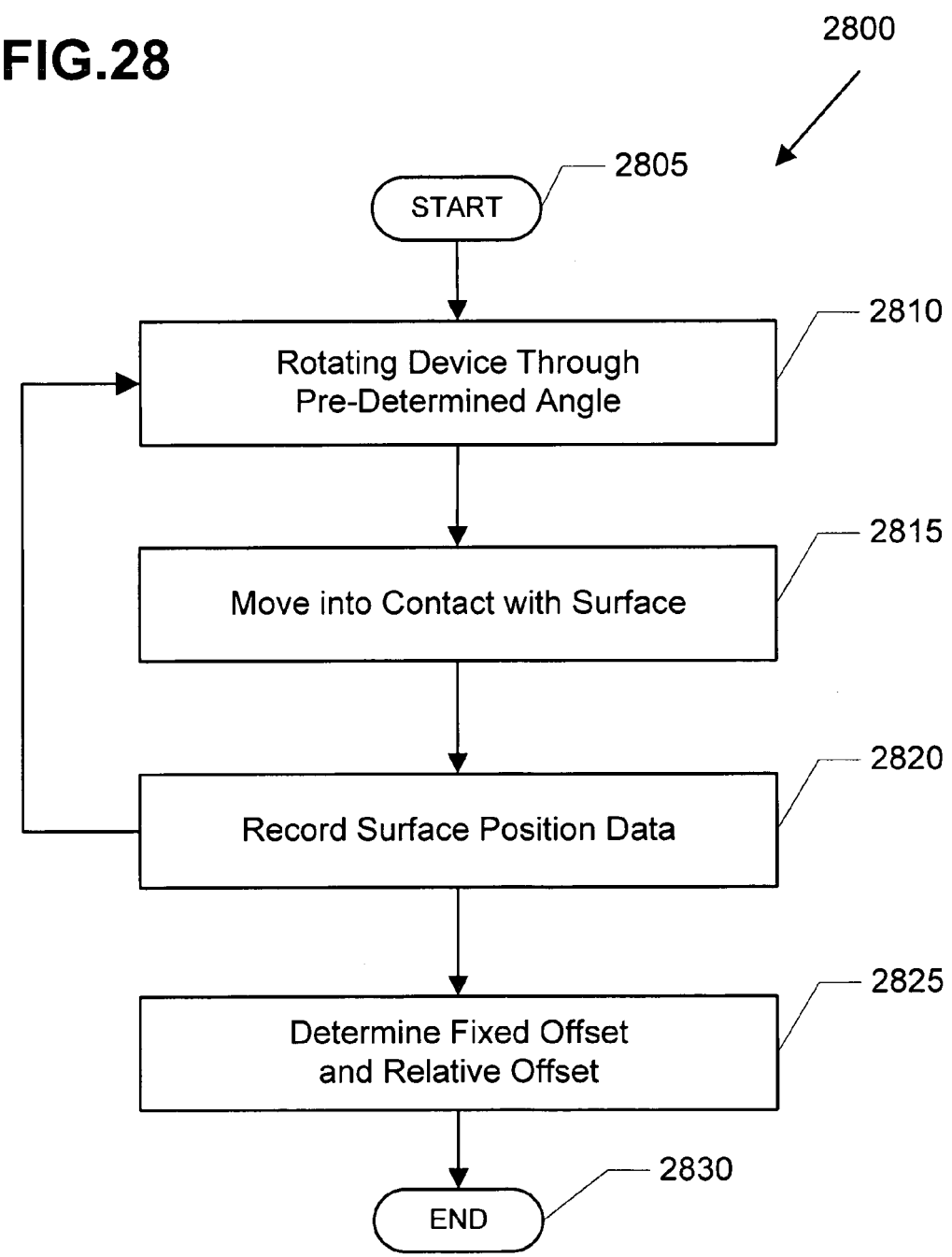

METHOD AND APPARATUS FOR CALIBRATING A VISION SYSTEM TO A PARTS HANDLING DEVICE

CROSS-REFERENCE TO RELATED APPLICATION

This application is based from U.S. Provisional Application Ser. No. 60/276,999 filed on Mar. 19, 2001 and entitled "AUTOMATED APPARATUS FOR TESTING OPTICAL FILTERS".

TECHNICAL FIELD OF THE INVENTION

The present invention, in general, is directed to systems for calibrating cameras to parts handling devices of particular benefit when used in an automated apparatus for testing and sorting optical filters.

BACKGROUND OF THE INVENTION

Commercially-available optical filters are used for various purposes. For example, in U.S. Pat. No. 6,141,469 to Kashyap, there is disclosed a multiple band pass optical filter that may be used in a wavelength division multiplexed ("WDM") communication system to filter individual WDM channels. U.S. Pat. No. 6,169,828 B1 to Cao, also relating to an optical filter, discloses a dense wavelength division multiplexer ("DWDM") for use in a fiber optic network. Various optical filters are well known to those skilled in the art.

Current methods of manufacturing such optical filters involve manually moving trays of optical filters, from the manufacturing station to a filter-testing station, and then manually testing each filter one at a time. An operator must manually pick a filter from the transfer tray, place it in a testing jig, align the filter in the jig either manually or automatically, test it with a laser and detector system, remove it from the jig, and place it back into the transfer tray. This process is unsatisfactory because it is very slow and prone to human error. Typical throughput is only 20–100 filters per hour.

OBJECTS AND SUMMARY OF THE INVENTION

In a first embodiment of the invention, a method of calibrating a vision system to a parts-handling device is provided for a system having a translatable parts-handling device and a vision system that includes an electronic camera, wherein the system is configured to translate the camera to the vicinity of a part, takes an electronic picture of the part, and, based upon the location of the part extracted from the picture and offset position data indicative of the offset between the camera and parts-handling device, then move the parts handling device into position for handling the part, a method of calibrating a vision system to the parts handling device. The method includes the steps of moving the parts-handling device to several predetermined positions, generating a signal at each position indicative of the device's position, recording the position of the parts handling device when the signal is generated, and using the position data to subsequently position the parts-handling device when it picks up parts.

The signal may be generated by actual contact between the device and a touch-off block.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

FIG. 2A is a cross sectional view of a gel pack tray as it is disposed in a vacuum mount wherein the sectional view is taken at Section 2—2 in FIG. 2;

FIG. 4 is an exploded perspective view of the components of an element of the optical filter-testing apparatus shown in FIG. 3 on an enlarged scale relative thereto;

FIGS. 5A and 5B are sequenced, sectional views depicting relative movement of the components of the element shown in FIG. 4 on an enlarged scale relative thereto taken along the central longitudinal axis ("Z" in FIG. 3) at Section 5—5;

FIG. 6A is an auxiliary partially-fragmented side elevational view, showing the relationship of certain elements or components not otherwise viewable from FIG. 6;

FIG. 7 is a partially-fragmented side elevational view depicting portions of the automated filter-testing apparatus shown in FIG. 1 on an enlarged scale relative thereto;

FIGS. 8A and 8B are sequenced and partially-fragmented side elevational views, depicting operation of the filter lift pin assembly of FIG. 6;

FIGS. 9A and 9B are sequenced and partially-fragmented perspective views, depicting an aspect or feature of the present invention which is also shown in FIG. 3, and on an enlarged scale relative thereto;

FIGS. 10A and 10B are sequenced, partially-fragmented plan views, depicting a detail of the invention shown in FIGS. 9A and 9B, on an enlarged scale relative thereto;

FIG. 28 illustrates an operation flow for a process for calibrating a vision system according to one embodiment of the present invention.

Throughout the drawings, like reference numerals refer to like parts.

DETAILED DESCRIPTION OF THE PREFERRED EMBODIMENTS

Figure 1:
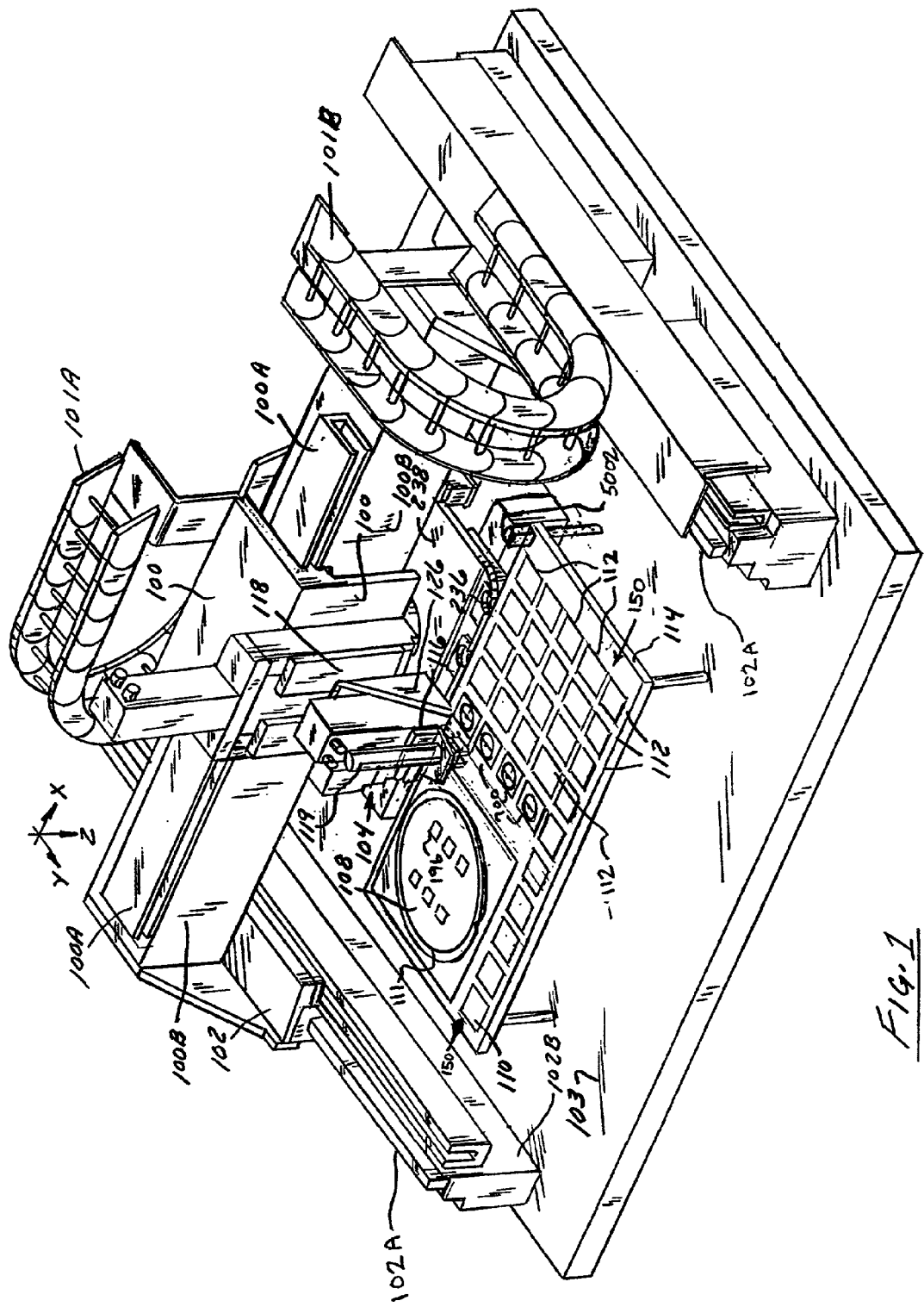
FIG. 1 is a system overview, in perspective, of the automated apparatus for testing optical filters of the present invention.
Figure 2:
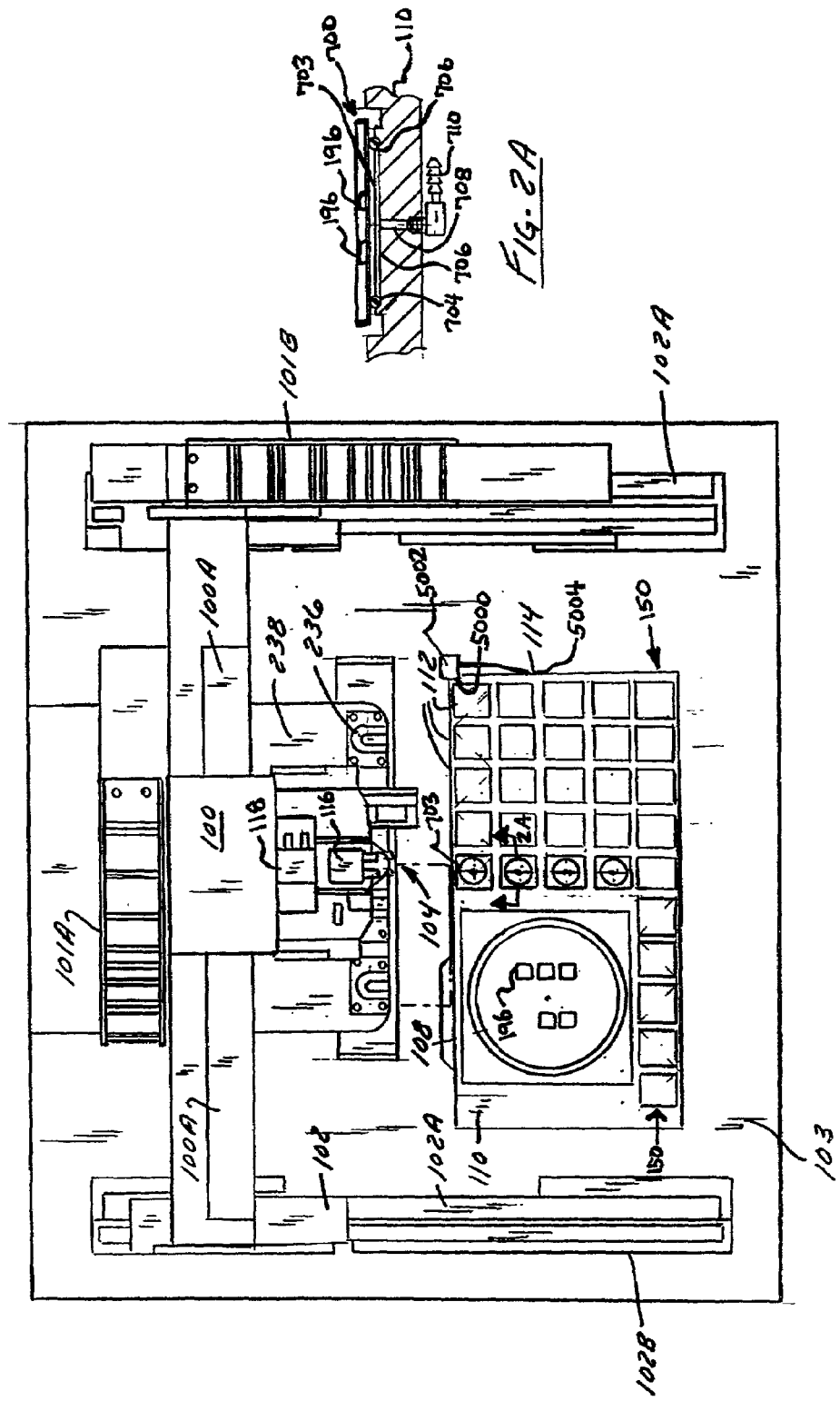
FIG. 2 is a plan view of the system overview shown in FIG. 1.

Referring initially to FIGS. 1 and 2, which depict a system overview of the automated apparatus for testing optical filters, there is shown an "X" gantry system 100, 100A and 100B; a "Y" gantry system 102, 102A and 102B; and a "Z" translator system 104, all of which systems are commercially-available devices, wherein the various components and/or elements of which systems are generally translatable in the "X," "Y" and/or "Z" directions relative to a base or floor 103. In particular, included with the "X" direction gantry system is an elongated "X" gantry support beam 100B that provides support for a generally U-shaped "X" gantry transverse-motion platform 100A on which an "X" gantry stage 100 is longitudinally disposed and slideably mounted.

Also shown is a conventional "X" axis cable protector 101A disposed generally above the "X" gantry system 100, 100A and 100B as well as a conventional "Y" axis cable protector 101B for the "Y" gantry system 102, 102A and 102B. Included with the "Y" gantry system 102, 102A and 102B is a pair of spaced-apart elongated "Y" gantry system support beams 102B (one of which is shown in the background) which are disposed on the floor or platform 103. The illustrated background floor-support beam 102B has fixedly mounted thereon one of a spaced-apart pair of elongated gantry rails 102A on which the "Y" gantry platform 102 is longitudinally disposed and slideably mounted. In reference to the "Y" gantry system, the foreground floor-support arrangement (not visible in FIG. 1 because of foreground structure) is similarly arranged. Preferably, the "X" gantry transverse-motion support beam 100B and spaced-apart "Y" gantry longitudinal rails 102A are mutually perpendicularly disposed.

In general, the "X" and "Y" gantry systems (FIG. 1), which are characterized as servo-controlled, are each provided with conventional high-speed closed-loop feedback systems adapted to translate the various elements and/or components of the apparatus for testing optical filters (of the present invention) along the "X" axis, the "Y" axis, the "Z" axis and to rotate those filters about the "theta" axis, as disclosed herein.

In operation, the "X" gantry system 100, 100A and 100B translates the "Z" translator system 104 along the "X" axis, while the "Y" gantry system 102, 102A and 102B translates the "Z" translator system 104 along the "Y" axis, enabling the operative portion of the "Z" translator system 104 to access the plurality of optical filters that are disposed on a UV-releasable adhesive tape 108 stretched on a hoop or frame 111, as shown in FIGS. 8A and 8B on optical filter-input or filter-receiving platform or table 110 and, after testing such optical filters, to transfer the tested optical filters to an assortment of tested-and-sorted optical filter classification trays 112 (shown as a four-by-four array of trays in FIGS. 1 and 2) which are located at a filter-output or filter-dispatch platform or table 114. The UV-releasable tape 108 may be purchased from Fitel Technologies (formerly Furukawa Electric Co.), as tape number UC-120M-120 (a non-expandable tape) or UC-353EP-110 (an expandable tape). Both tapes are low-tack UV-release tapes that are typically used in wafer-dicing applications.

Alternatively, optical filters can be supported in gel packs or vacuum release trays that are disposed on filter receiving table 110. These trays are supported in specially configured vacuum mounts 700 located on table 110.

Referring to FIG. 2A, vacuum release trays 702 are placed in vacuum mounts 700 on an O-ring seal 704. The O-ring seals against both the bottom of the tray and the mount itself to form a vacuum chamber 703 defined by the bottom surface of the tray, the O-ring and the mount. Two grooves 706 extend from the O-ring inwardly to a vacuum port 708. The vacuum port 708 extends through the table 110 to a vacuum fitting 710 disposed on the bottom surface of table 110. A vacuum is selectively applied to the vacuum fitting to suck air out of the chamber 703. This reduction in pressure in the chamber 703 both holds the tray 702 in mount 700 and weakens the grip trays 702 have on filters 196.

As background information, the optical filter array or tray, before being placed by hand or machine as desired onto the filter-receiving table 110, were formed at a prior station (not shown) where a glass substrate with an optical coating (also not shown) was divided into individual optical filters 196.

Figure 3:
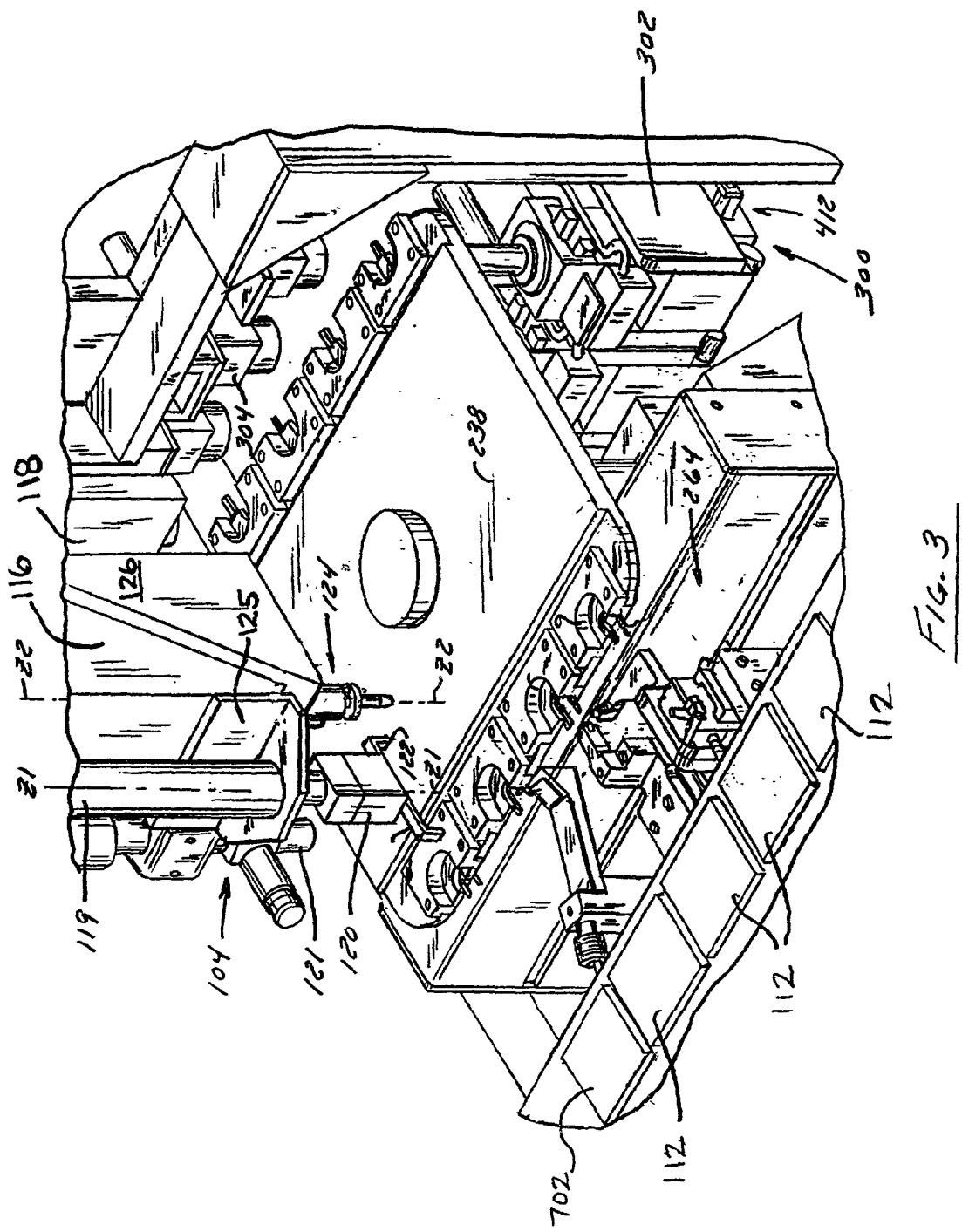
FIG. 3, a partially fragmented view in perspective, depicts a portion of the optical filter-testing apparatus, on an enlarged scale relative to FIGS. 1 and 2.

Referring next to FIG. 3, the "Z" translator system 104 includes a theta-axis stage 116 mounted on a "Z" axis stage 118 via bracket 126. Theta stage 116 is a motor having an output shaft 168 that is rotatable to predetermined angular positions under computer control. This stage is termed the "theta-axis" stage since it rotates the probe to an angle theta about an axis that is disposed parallel to the "Z" direction or axis (i.e. vertically) and passes through the center of stage 116. The theta axis therefore translates with the theta stage and (in the preferred embodiment) extends through the longitudinal centerline of the probe assembly. The theta stage may be characterized as a servo-controlled axis.

The tray-handling end effector cylinder 119 is connected to bracket 126 via bracket 125 to enable the tray-handling end effector 120 which is coupled to the end of the moveable rod of cylinder 119 to extend and retract along (preferably in non-rotative relationship relative to) a first vertical axis Z1—Z1 relative to the optical filters at the input platform 110 and/or the output platform 114. The "Z" translator system 104 further includes a standard machine vision camera 121 (FIG. 3), to enable accessing the optical filters at the filter-input platform 110 and, after testing such optical filters, to enable transferring the tested filters to the filter-output platform 114. The camera is also coupled to "Z" axis stage 118.

The tray-handling effector 120 includes times or fingers 122 operably mounted on the effector 120 for grasping and retrieving the optical filter-carrying trays 112 at the output platform 114 and for transferring such trays, after filter testing, to a front row depot. This depot, identified in FIGS. 1 and 2 as row 150 is used for storing empty trays, completed trays of tests and lids for trays that can be accessed both to replenish depleted tests, replace depleted input test trays and to remove completed test tray and replace them with empty trays. The effector 120 is configured to drive fingers 122 apart or together to selectively grasp or release the individual trays under computer control.

The "Z" translator system 104 further includes a filter-capture end effector 124, also generally referred to within this patent specification either as the vacuum probe assembly or as "the head" 124, which is mounted on the rotatable output shaft 168 of theta stage 116 which is mounted on Z translator system 104, which, in turn, is operably affixed to the moveable "X" gantry stage 100 (FIG. 1), to enable the vacuum probe assembly or head 124 to move up and down along (and rotate about) a second vertical axis Z2—Z2 (FIG. 3). Vertical axis Z2—Z2 is parallel to the "Z" axis.

Referring to FIG. 4, the vacuum probe assembly or head 124 includes a generally cylindrical and elongated sleeve 128, which defines a blind hole 130 (FIG. 5A) into which an elongated vacuum probe 152 is disposed. This probe is slidably received in through blind hole 130 in which it is supported.

The vacuum probe assembly or head 124 further includes a generally cylindrical collar clamp 142 also defining a through bore 144. The cylindrical collar clamp 142, in turn, defines a radially-disposed through-slot 146. The illustrated clamp 142 further includes a transversely offset threaded fastener 148, for enabling the cylindrical sleeve 128 and the cylindrical collar clamp 142 to be removably affixed together in a conventional manner. The cylindrical sleeve 128 also defines a cylindrical neck portion 150, of reduced outer diameter relative to the outer diameter of the cylindrical sleeve 128, for enabling the cylindrical neck portion 150 of sleeve 128 to be snuggly engageable within, and readily removable from, the through bore 144 of the cylindrical collar clamp 142 in a conventional manner.

Shaft 168 (FIG. 5A), to which neck portion 150 is attached by clamp 142, defines an axially disposed internal fluid passageway 170 (shown in phantom line in FIGS. 5A and 5B).

The vacuum probe assembly or head 124 also includes a generally cylindrical alignment clamp 174, which defines a radially disposed slot 176 and a central through bore 178. The inner diameter of the alignment clamp through bore is so matched relative to the outer diameter of the lower cylindrical band 172 of vacuum probe 152 as to enable the cylindrical band 172 to be snuggly disposable into the alignment clamp through bore 178. The illustrated alignment clamp 174 further includes a conventional threaded fastener 180 located adjacent to the through bore 178 and disposed transverse to the radial slot 176 for releasably affixing alignment clamp 174 onto the cylindrical band 172 of the generally cylindrical and elongated vacuum probe 152 in a conventional manner.

The alignment clamp further defines an axially disposed, stepped bore 182 (FIG. 5A) spaced from the through bore 178, into which stepped bore 182 a matched stepped threaded fastener 184 (which functions as a spacer) is disposed. An end portion 186 of spacer 184 is threaded, and cylindrical outer sleeve 128 defines a threaded bore (FIGS. 5A and 5B) having threads that mate with the end portion 186 of fastener 184.

The cylindrical outer sleeve 128 further defines a transversely disposed and threaded side bore 190 of substantially identical inner diameter as a similar transversely disposed and threaded side bore 188. These two bores are configured to receive threaded vacuum fittings, and are fluidly coupled together with a length of flexible tubing 189. The inner end of bore 190 is in fluid communication with passageway 170 since both open into a chamber 191 defined at the upper end of sleeve 128 located between the sleeve and the lower end of shaft 168.

Side bore 188 of probe 152 is in fluid communication with an axially oriented intermediate fluid passageway 166. Probe 152 also includes a threaded plug 162 disposed in the upper portion of bore 154 (FIGS. 5A and 5B) and providing a fluid tight seal thereat. Probe 152 defines an axially aligned orifice 164, which is in fluid communication with bore 154 via an intermediate fluid passageway 166.

Flexible tubing 189 is configured to permit probe 152 to slide up and down within sleeve 128.

When a vacuum is drawn by conventional means to impose vacuum at inner passageway 170, this vacuum is communicated to bore 190, through the length of flexible tubing and through bore 188. The vacuum is then communicated through intermediate fluid passageway 166 and thence to orifice 164.

In operation, downwardly disposed member 168 is axially advanced toward an optical filter 196 (shown in phantom line in FIGS. 5A and 5B), for enabling the orifice 164 of the vacuum probe 152 to contact the optical filter 196.

Sufficient vacuum is imposed at fluid passageway 170 to enable the optical filter 196 to be held by the orifice 164, after the optical filter 196. When the orifice 164 initially makes contact with the optical filter 196, vacuum probe 152 moves axially upward relative to sleeve 128, sliding upward within sleeve 128 into blind hole 130.

By permitting probe 152 to "collapse" the length of the probe assembly on initial contact with the filter, the risk of damage to the filter is substantially reduced, by providing a soft landing for advancing vacuum probe 152. A soft landing is insured but only until alignment clamp 174 abuttingly engages the cylindrical outer sleeve 128. This abutting relationship is shown in FIG. 5B. For this reason, the system is configured to stop the downward advance of the "Z" stage (to which probe assembly or head 124 is mounted) before clamp 174 abuts sleeve 128. In an alternative embodiment, individual filters can be selected from any of the gel trays 702 that are held in vacuum tray mounts 700 (FIGS. 1, 2 and 2A).

Referring back to FIGS. 1 and 2, the "X" gantry system 100, 100A and 100B translates the head 124 along the "X" axis while the "Y" gantry system 102, 102A and 102B translates the head 124 along the "Y" axis, to enable the head 124 to be moved to any point in the X-Y plane, so that the head 124 can access optical filters on the filter-input platform 110 and, after testing and sorting the optical filters, thereafter transfer tested-and-sorted optical filters wherever desired onto output platform 114.

Reference is next invited to FIGS. 6, 6A, 7, 8A and 8B, to discuss a "pick and place" procedure as well as a filter lift pin assembly 200 (FIG. 6), both of which are additional features of the present invention. The filter lift pin assembly 200 (not visible in FIG. 1) is located generally beneath the optical filter input platform 110 shown in FIG. 1. The optical filter lift pin assembly 200 includes a base 202, a guide bracket 204 mounted on the base 202, and a pneumatic cylinder 206 spaced in distal relation to the bracket 204.

The pneumatic cylinder 206, also mounted on the base 202 via a chambered alignment block 208, is operably connected via a piston rod 210 to a wedge 212. The guide bracket 204 includes an upper surface 214, which defines an aperture through which a filter lift pin 216 and a pin guide bushing 218 are disposed. Pin 216, disposed through the through bore of pin guide bushing 218, is urged downwardly into sliding engagement with the wedge 212 by a helical spring 217 which is captively retained by the pin 216, as is shown in FIG. 6A. An upper surface of wedge 212, on which lift pin 216 rests, is inclined relative to precision linear slide 219 fixed to the base 202.

The pneumatic cylinder 206 operates in a conventional manner to extend and retract the piston rod 210 along the axis X1—X1 (which is parallel to the "X" axis). Such reciprocal action, in turn, causes the lift pin 216 to extend upward or retract downward relative to the base 202 and the bracket upper surface 214. The axis of pin extension and retraction is parallel to the "Z" axis.

Wedge 212 is supported on and fixed to the upper translating portion 225 of linear slide 219 by conventional threaded fasteners 221. The lower fixed portion 227 of linear slide 219 is fixed to base 202 by fasteners 223. See FIG. 6A.

Linear slide 219 is preferably a conventional precision slide that uses recirculating ball bearings between the upper translating portion 225 and the lower fixed portion 227 of slide 219. By using slide 219, reduced friction translation of wedge 212 is provided when moving from a pin 216 down position to a pin 216 up position and vice versa.

To achieve precision movement of the wedge 212 in this regard, the lift pin assembly 200 further includes a wedge-extension flow-control device 220, which is operably coupled to pneumatic cylinder 206 via a chambered right-angled pneumatic fitting 221, as well as a wedge-retraction flow-control device 222, which is mounted directly on the pneumatic cylinder 206.

A spool-shaped coupling 224 is threaded onto the free end of rod 210 to mechanically couple the free end of the rod to wedge 212. The spool is locked onto rod 210 by a jam nut 229 that is also threaded onto the free end of rod 210 and is tightened against spool 224 to hold it in place. The spool, in turn, is disposed in a downwardly-facing slot 231 formed in a downwardly-facing surface of wedge 212. A small cylindrical gap is provided between the spool and the wedge to permit slight misalignment between the cylinder and the wedge. This gap permits a slight lateral and vertical misalignment of the wedge and cylinder to exist without causing the rod to bind in the cylinder.

Control devices 220 and 222 are each connected to the pneumatic cylinder 206 (as described above) and separately via conventional fittings 224 and 225 and via conduits 226 and 227 to a flow-control fluid source (not shown) in a conventional manner.

Figure 6:
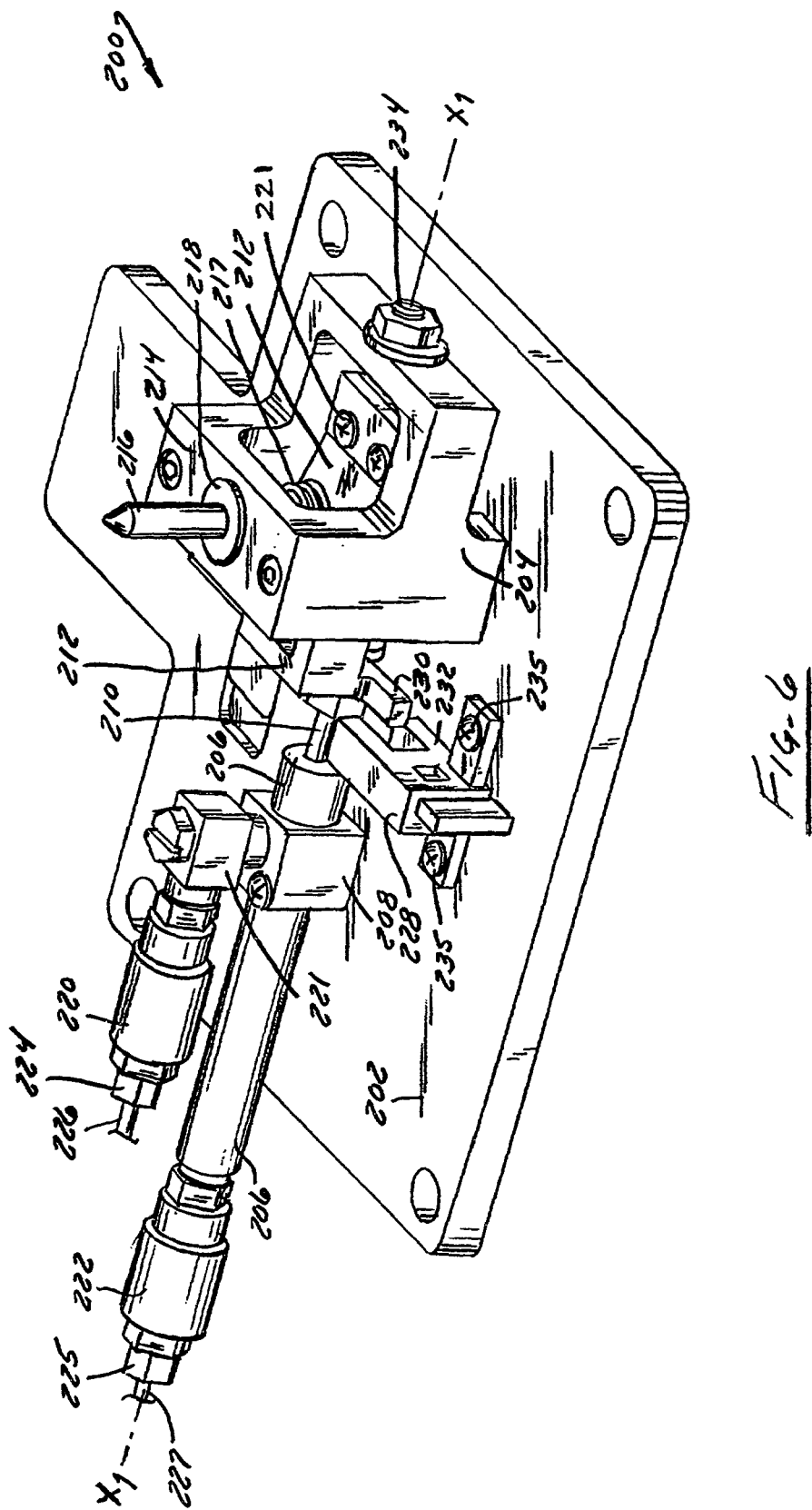
FIG. 6 is a perspective view of a lift pin assembly feature of the invention.

As is shown in the foreground in FIG. 6, the filter lift pin assembly 200 further includes an optical lift pin extension sensor 228 mounted on the base 202 and disposed transverse to the piston rod 210. Not visible in FIG. 6 but located behind the guide bracket 204 is a second extension/retraction sensor that is similarly disposed transverse to the piston rod 210. As is shown in the foreground in FIG. 6, the wedge 212 defines a lateral finger 230, and the foreground-mounted lift pin extension sensor 228 includes an end portion 232 defining a U-shaped slot through which the lateral finger 230 is passed for sensing extension or retraction of the pin 216 relative to the base 202. The wedge 212 further includes a similar lateral finger (not visible in FIG. 6, as it is hidden behind the guide bracket 204); and the background-mounted lift pin extension sensor (not visible in FIG. 6) similarly includes an end portion (not visible in FIG. 6) defining a U-shaped slot through which the background lateral finger is similarly passed for sensing extension or retraction of the pin 216 relative to the base 202. To provide adjustment of the guide bracket 204 as well as the extension sensors 228 along the upper surface of the base 202, the guide bracket 204 and extension sensor 228 (as is shown for the foreground sensor) are respectively provided with conventional threaded fasteners 234 and 235.

In operation, the piston rod 210, spaced above and parallel to base 202, is caused to move relative to the base 202, for causing the optical filter lift pin 216 to extend toward or retract from platform or table 110 and tape 108 in frame 111, as shown in FIG. 7. More particularly, as the lift pin 216 contacts the underside of adhesive tape 108, the tape 108 as well as the optical filters 196 adhesively held thereon are urged slightly upwardly, toward the machine vision camera 121 and the head 124, as shown in FIGS. 8A and 8B, to help break the adhesive bond between the filter 196 and the tape 108.

Figure 8C:
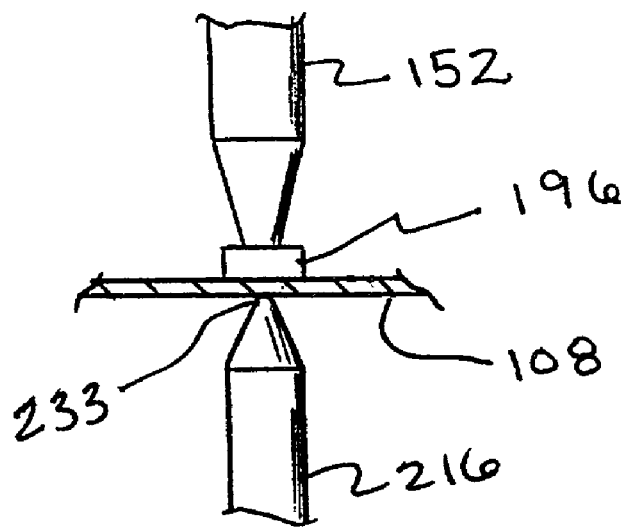
FIGS. 8C and 8D are partially-fragmented side elevation views of the probe tip, the lift pin, the tape and a filter illustrating how the filter is partially released from the tape as it is raised by the lift pin.
Figure 8D:
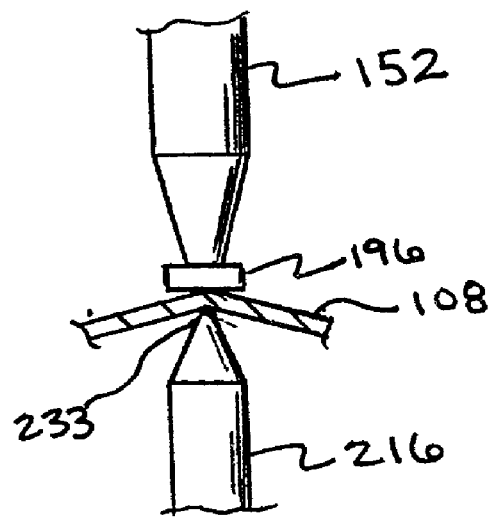

As shown in FIG. 8C, each filter is in substantial complete contact with adhesive tape 108 when the tape is relaxed. FIG. 8D, however, illustrates how the tape-to-filter relationship changes when lift pin 216 deflects tape 108 upwards. As tape 108 is forced upward by pin 216, it causes the contact area between the tape and the filter to be reduced. The tape is deformed over the radiused tip 233 of pin 216, causing it to form a curved surface. The formation of this curved surface causes the portions of the tape that were previously adhered to the filter (as shown in FIG. 8C, to pull away from the filter. As a result, the area of the filter that is adhesively attached to the tape is significantly reduced and the filter, when grasped and pulled away from the tape by probe 152 will release from the tape more gently and with reduced force.

Note that the degree of deflection provided by lift pin 216 in FIG. 8D and the degree that the tape is curved due to pin 216 has been deliberately exaggerated to make the reduced contact area between tape 108 and filter 196 more apparent.

The machine vision camera 121, fixedly mounted to the "Z" axis stage 118 and to the "X" gantry stage 100, is in parallel relation to head 124; and the "Z" axis stage 118 is laterally translatable along "X" gantry support beam 100B, as shown in FIG. 7. As described above in regard to FIG. 1, the "Y" gantry platform 102 is also movable along "Y" gantry beams to provide motion of the "Z" axis stage 118 in a direction that is orthogonal to the "X" direction motion provided by the "X" gantry stage. Thus, the system is configured to move the "Z" axis stage 118 in both the "X" and the "Y" direction under computer control. The head 124 picks up optical filters 196 (FIGS. 8A–D) and places them in proper position in individual nests 236 of a rotary processing table 238 (FIGS. 3 and 7) to be tested individually. In general, the head 124 first picks up optical filters 196 individually from the input tape frame 111 (or the vacuum release trays 702) and then, after the filters have been optically tested, places the tested optical filters 196 individually into filter classification trays 112, as shown in FIGS. 1, 2, 3 and 13.

The base 202 of the filter lift pin assembly 200 is fixedly mounted on a separate "X" direction translation device 242 and a "Y" direction translation device 243 (FIG. 7) for moving the filter lift pin assembly 200 across the base 103 relative to the input table 110 and the input tape frame 111. The two devices 242 and 243 permit the filter lift pin assembly to be moved in both the "X" and the "Y" direction and thereby positioned under any filter 196 on adhesive tape 108. These two devices operate under computer control to permit lift pin 216 to be located under and to lift any of filters 196 under computer control. Translation devices 242 and 243 are preferably linear electrical motors configured to be operated under computer control.

The machine vision camera 121 (FIGS. 3 and 7) has a collimated field of view for viewing and locating the optical filters 196 to be picked up. The camera 121 and head 124 are spaced in parallel relation. Head 124 is moved by the "X" and "Y" gantry systems in response to information provided by the machine vision camera 121, so that the head 124 is located directly above one optical filter 196 to be picked up.

After being vertically aligned above such optical filter 196, the "Z" axis stage 118 (FIG. 7) is then actuated causing head 124 and vacuum probe 152 (FIGS. 8A and 8B) to extend downwardly to contact such optical filter 196. Downward movement of the head 124 is generally completed before the outer sleeve 128 of head 124 contacts the alignment clamp 174 (which is shown in FIG. 5B) to avoid damaging the optical filters 196. In addition, the "Z" stage is also provided with sufficient extra travel such that it does not reach the end of its travel before vacuum probe 152 contacts filter 196, but has a comfortable margin of extra motion available. This margin will, of course, be determined on a case-by-case basis depending upon the particular geometry of the machine.

Once the probe 152 and filter 196 make contact, a vacuum is applied to orifice 164 and hence to filter 196. Optical filter lift pin 216 is then raised upwardly until it is in the position shown in FIG. 8C. At this point, the filter is captive between pin 216 and probe 152.

Pin 216 continues moving upward causing the adhesive tape to deflect upwardly and bend around the radiused tip of lift pin 216, thereby reducing the area of adhesion between filter 196 and the adhesive tape as described above.

At the same time lift pin is deflecting the tape upwardly, it is also moving the desired filter 196 upwardly and is collapsing vacuum probe 152 into sleeve 128 as shown in FIG. 8D.

Next, the head 124 is retracted upwardly by operation of the "Z" axis stage 118, causing the head 124 to be lifted above the table 110 and frame 111. As probe 152 is lifted, it pulls filter 196 away from the remaining portion of adhesive tape holding filter 196 to the adhesive tape by way of the vacuum applied to the top of filter 196. Once free of the surface with the filter attached to the end of the probe the "X" and "Y" gantry systems translate head 124 and hence filter 196 in both the "X" and the "Y" directions above processing table 238, as shown in FIG. 7. In general, this "pick and place" procedure is repeated until each of the four forward most nests 236 of processing table 238 is provided with an optical filter 196 for testing.

To insure that the probe is accurately positioned with respect to the filter, a calibration routine is performed in which errors or misalignments of the probe with respect to the camera 121 are determined.

As described above, the position of the filter is determined based upon the position of the camera (indicated by the drive signals applied to the "X" and "Y" stages when the filter is in the camera's field of view) and by the offset of the filter within the camera image.

The absolute position of the filter is determined by summing these two values.

As described above, once the position of the filter is determined, the probe must be moved to a precise position above the filter in order to contact and pick up the filter.

In order to position the probe accurately above the filter, the distance between the probe tip and the camera must also be known, for the "X" and "Y" stages must be moved this distance in order to locate the probe above the filter.

The camera-to-probe distance, however, can be known only approximately based solely upon the dimensions (and their associated dimensional errors) of the parts located between the probe tip and the camera.

The dimensional errors refers to errors in manufacturing and assembling the probe tip, the probe sleeve in which the tip is inserted, the "theta" stage motor that supports and rotates the probe, the rotating shaft in the theta stage, the theta stage motor mounts and the location of the theta stage mounting holes with respect to the camera mounting holes, among others.

Errors in any of these dimensions are additive and provide a relatively large circle of positional uncertainty of the probe with respect to the camera.

To eliminate this error, one might manufacture or purchase extremely accurate components and provide extremely precise adjustment features. This, however, would be prohibitively expensive. An alternative approach, and the one employed by the present invention, is to first determine the location of a feature (a corner of the touch-off block) using the camera and then again determine the location of the corner of the touch-off block, but this time by making electrical contact, using the probe, with each of the two edges that intersect at the corner that was located by the camera. Since both locations use the same frame of reference (the X,Y gantry), the offset between the camera and probe can be calculated by simply subtracting the corresponding X and Y values.

Figure 27:
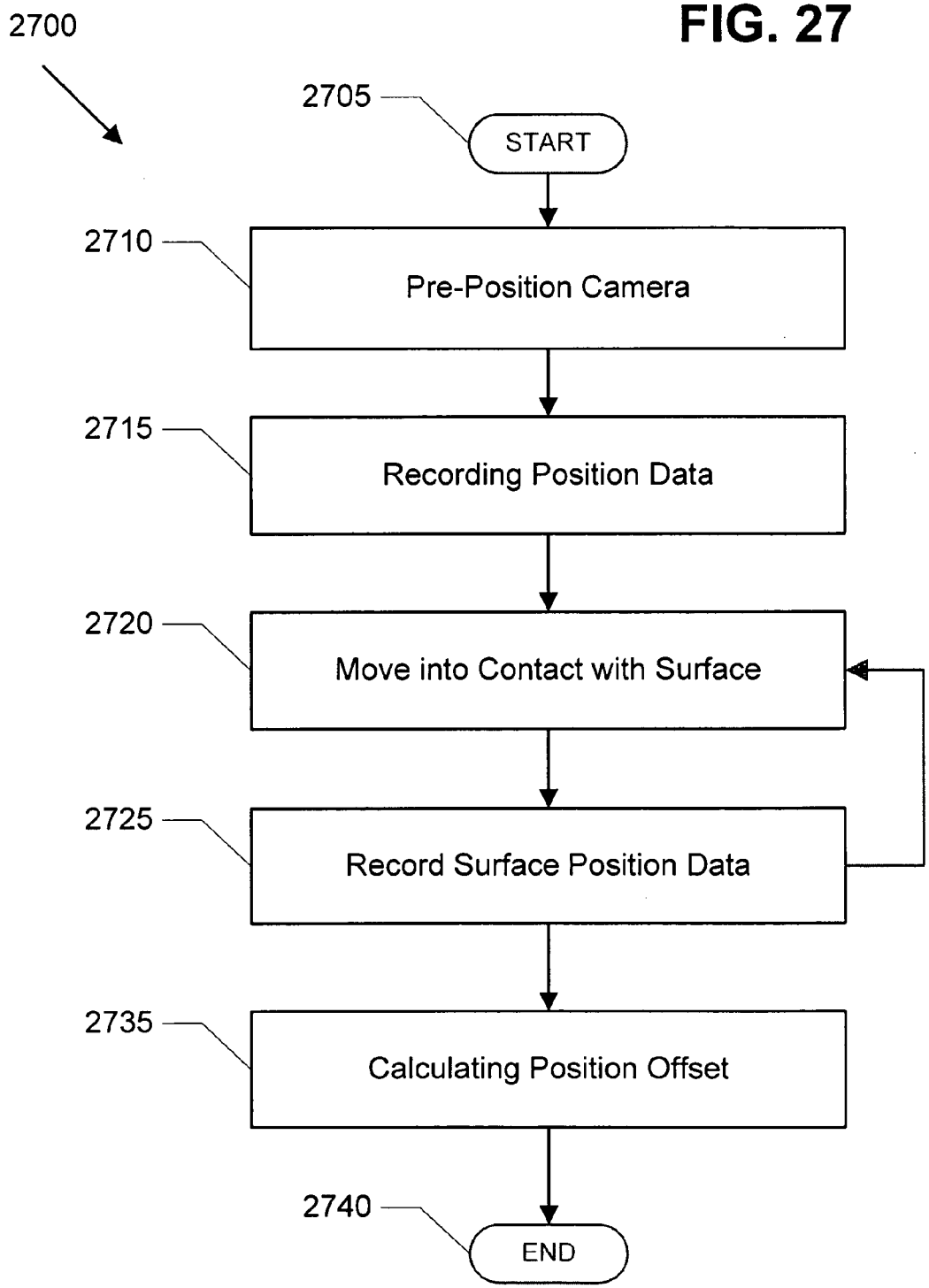
FIG. 27 illustrates an operation flow for a process for calibrating a vision system according to one embodiment of the present invention.

The process is illustrated in FIGS. 27 and 28. Referring now to FIG. 27, the process starts at module 1705 and proceeds to the first step at operation 2710. The first step at operation 2710 is to pre-position the camera over the corner of the touch-off block so that the corner is in the field of the view. This is done one time when the machine is first set up and the coordinates are saved. After going to the pre-position, the computer finds the corner and records the x and y coordinates of the corner relative to the center of the camera in operation 2715.

Next, the probe is pre-positioned near the touch-off block in x, y and z for performing the "touch-off" in the "y" direction. This is done one time when the machine is first set up and the coordinates are saved. The same procedure is repeated for "touch-off" in the "x" direction. The "touch-off" procedure is illustrated in FIG. 28. The probe is (1) rotated in operation 2810 using the "theta" stage to a first predetermined angle, (2) moved in operation 2815 until it contacts first surface 5000 of touch-off block 5002 as indicated by a contact sensor connected to the computer and (3) a record of its position is made by the computer in operation 2820.

In the preferred embodiment, the sensor is a single digital signal line with a pull-up that is coupled to the computer.

The digital signal line is coupled to the touch-off block, which is electrically isolate from the structure to which it is mounted. As a result, as long as the probe, which is grounded, is not contacting the touch-off block, the signal on the signal line will be pulled up to a logical "1". The moment the probe contacts the touch-off block, the pull-up will be grounded and the signal on the signal line will be a logic "0". The touch-off block is made of a conductive metal. Therefore, whenever the probe touches the touch-off block, the signal on the signal line goes from a logical "1" to a logical "0".

The computer signals the "X" stage to move the probe in the "X" direction very slowly (approximately 0.01 in/sec) until the sensor signal goes to logical "0". Once the signal goes to a logical "0", the position of the probe (as a function of the position of the "X" stage) is recorded.

Operations 2810–2820 are then repeated for a second angle. The probe is then backed away from the block in the "X" direction, rotated to a second predetermined angle (preferably 90 degrees from the first predetermined angle) and the incremental moving, touching and recording steps are repeated.

Operations 2810–2820 are then repeated for a third angle. The probe is again backed away from the block in the "X" direction again, rotated to a third predetermined angle (preferably 180 degrees from the first predetermined angle) and the touching and recording steps are repeated again.

If the probe were perfectly symmetric and centered about the rotational axis of the theta stage, each of these three positions would be the same. As a practical matter, however, there will be a small but significant off-center rotation of the probe when the theta stage (to which it is attached) rotates.

As a result, the true position of the probe with respect to the surface it touches, and hence the true position of the probe with respect to the camera will vary depending upon the rotational position of the theta stage.

For convience in calculating the offset, the offset can be broken down into two components:(1) a combination of a fixed offset distance from the camera to the center of rotation of the theta axis, plus (2) an additional offset due to the misaligned and off-center coupling of the probe to the rotating shaft of the theta stage.

For this reason, the computer, in operation 2830, calculates these two offsets (one fixed and invariant, the other a function of the rotational position of the probe) and saves them for later use when positioning the probe in a specific rotational position near a filter.

These two offsets (fixed and rotational) are used (1) to position the probe over a gel pack or tape frame when the probe picks up a filter, (2) to position the probe with attached filter over a flexure before placing it in the flexure, (3) to position the probe over a flexure before picking up the filter, and (4) to position the probe over the appropriate sorting tray before depositing a tested filter in one of the sorting trays.

Referring back to FIG. 27, it should be clear that the calibration process described above only provides the probe offset from the camera to the probe in a single direction: the direction perpendicular to the surface of the touch off block that it contacts. Since the contact was made with surface 5000 of the touch-off block and since this surface is perpendicular to the "X" direction of travel, this calibration method will only provide a true measure of the camera-to-probe distance in the "X" direction using the "X" stage.

The probe is also moved in the "Y" direction using the "Y" stage and therefore the same calibration process is used to determine a fixed and rotational offset in the "Y" direction by touching the probe three more times as described above, but this time against surface 5004 which is perpendicular to the "Y" direction of travel.

At the end of this process 2700, the system determines at operation 2735 a fixed, (i.e. rotationally independent) "X" and "Y" offset of the probe with respect to the camera and has also determined a rotational "X" and "Y" offset that is a function of the rotational position of the probe provided by the theta stage. Whenever the probe is rotated to particular angle, either for picking up a part or for placing a part, the proper "X" and "Y" positions of the "X" and "Y" stages are calculated to take the rotational offset into account.

In an alternative embodiment, a table (or tables) of pairs of "X" and "Y" offsets versus probe rotational positions may be calculated after calibration and used during all subsequent pick and place probe operations. In this manner, one can eliminate the repetitive calculation of "X" and "Y" offsets based on new rotational positions that would otherwise be required every time the probe is rotated.

Calibrating for the Post Height:

Just as the system need to know the "X" and "Y" offsets of the probe with respect to the camera, it similarly needs to know the location of post 512 (SEE FIG. 9A) with respect to the probe the "Z" direction. A separate calibration process is performed to determine this distance.

As described above, when the probe approaches each of the flexures to either pick or place a filter, it moves downward until the filter is mechanically held between the post and the probe tip with a slight compression of the probe tip within its sleeve. Once in this position, the filter is securely held on its top and bottom planar surfaces by the probe and the post. The flexures can be moved or vacuum turned on or off without the risk that the filter will be accidentally ejected from the machine.

An electrical potential is applied to the post, which is a conductive metal. This potential may be always applied, or it may be selectively applied via a computer-switched electrical connection coupled to the post.

The post is first positioned by the linear motor 510 to the right (as viewed in FIG. 1) of rotary processing plate 238. The post is raised into position adjacent the bottom of a flexure, in the same position it would be in when supporting a filter at a flexure.

The probe (which is coupled to the sensor circuit as described above) is moved into position over the post at the flexure.

The probe is lowered by the computer which moves the "Z" stage downward very slowly (approximately 0.01 in/sec). The computer continuously checks the sensor signal line to see whether the probe has contacted the post.

This process of lowering and checking continues until the probe touches the post. Once the probe touches the post, the signal line will go from logic "1" to logic "0" as electricity is communicated from the probe, through the post to electrical ground.

When the probe contacts the post, the system records the position of the probe (as a function of the "Z" stage position).

Once the "Z" height of the post is recorded, it is used to determine the proper downward ("Z" direction) stopping point of the probe, based on the thickness of the filter, when the probe is lowered into contact with the filter.

For a filter having a nominal thickness "Q", the probe is lowered to the calibrated height ("Z" direction) of the post plus the thickness of the filter, minus a small amount of desired probe compression in the probe sleeve. These calculations are performed by the computer when it brings the probe downward in contact with the filter at each flexure location.

Calibrating the Probe for Lift Pin Height:

In a similar fashion to the post height calibration, the lift pin height may also be calibrated.

A small fixture could be placed, temporarily, over the lift pin 216. This fixture would be connected to the touch-off circuit and electrically insulated from the pin. The fixture would have a "touch-off" surface coplanar with end of the lift pin 216. A touch-off procedure similar to that used for determining the post height can also be used for determining the height of the lift pin in its raised position. The lift pin height can be used to calculate the proper lowered position of the probe over the tape frame when picking a filter off the frame.

Reference is next directed to FIGS. 9A, 9B, 10A, 10B, 11, 12, 13, and 22 to discuss an "automated material handling system," which is yet another aspect or feature of the present invention. As mentioned above, the head 124 picks up selected optical filters 196 individually from the input tape frame 111 (FIGS. 8A and 8B) and the "X" and "Y" gantry systems are employed to move the "Z" axis stage 118, that has been spaced above a selected nest 236 of the rotary processing table 238 (FIG. 7), so as to place an optical filter 196 into each nest 236 for further optical filter processing. For this purpose, each nest 236 of the rotary processing table 238 is provided with an individual flexure 250 (FIGS. 3, 11 and 12) for holding a single optical filter 196.

The flexure 250 is generally elongated (FIG. 11), defining circular apertures 252 for fixedly mounting individual flexures 250 to the rotary table 238. The flexure 250 also defines generally elongated and opposed apertures 254. The flexure 250 further defines a longitudinal slit 256 that is generally disposed between the elongated apertures 254. In particular, the elongated apertures 254 are defined both by external sidewalls 258 as well as by inner sidewalls 260 of the flexure 250. The inner sidewalls 260, which form a portion of the elongated apertures 254, straddle and define the slit 256. The external sidewalls 258 as well as the inner sidewalls 260 are sufficiently dimensioned, in a direction transverse to the slit 256, and the material of flexure 250 sufficiently elastically flexible or "springy" such that spaced-apart jaws 262, also defined by the flexure 250, repeatedly return to their original spacing, after being spread-apart by a small distance, as described below.

The flexure is preferably a monolithic device manufactured out of a single piece of metal such as steel, using electro-discharge machining (EDM) operations. Each of the inner and outer sidewalls is preferably of substantially the same length and are substantially parallel thereby defining (together with the mounting portion 253 and the jaws 262) two parallel four bar linkages.

Unlike common four bar linkages, in which there is a separate mechanical coupling at each of the junctions, the inner and outer sidewalls elastically deform forming a slight "S" shape as each arm is moved away from gap 256.

Each arm includes an inner and an outer sidewall that are of substantially the same length and are substantially parallel. With this arrangement, when the arms are deflected apart, they move apart with limited rotation each moving along a short curvilinear path.

By constraining the motion of the free ends of the arms to curvilinear translation, the lateral forces applied to open the arms is substantially the same as the lateral force applied by the arms against the filter to hold the filter in place.

The thickness of the sidewalls (as measured in the "T" direction) is preferably smaller than the height of the sidewalls (as measured in the "H" direction). To insure equal deflection of both arms when a force is applied, the length of the sidewalls and their cross-sectional areas are preferably the same and are constant over substantially their entire length. In a typical flexure, the height of the sidewalls will be between 0.05 and 0.15 inches. The thickness of the sidewalls will be 0.015 to 0.04 inches. The thickness to height ratio is preferably between 2 and 5. As this ratio increases, the arms become more stiff and resistant to deflections in the "H" direction, as compared to deflection in the "T" direction.

The height to length ratio of the sidewalls of the flexures is a strong indicator of the flexure arms' resistance to bending in the "H" direction. If the arms were susceptible to bending either upward or downward more than a tiny amount, the filters will not consistently be held in a flat orientation—the position in which they need to be held for testing. Only a slight bending upward of one arm with respect to the other, on the order of an angle of 0.1 degrees or so, will cause the filter to be twisted between the two arms (i.e. rotated about the "L" axis) by perhaps 5–20 degrees. This large twisting would require significant (and slow) movement of the goniometers to find and move to their proper perpendicular position with respect to the bottom surface of the (twisted) filter before testing can begin. For this reason, and given the specific requirements of this application, the length to height ratio of the arms of the flexure is preferably at least 5 and no greater than 50. More preferably, it is at least 8 and no greater than 40. Even more preferably, it is at least 15 and no greater than 30.

The thickness to length ratio of the sidewalls of the flexures is a strong indicator of the sidewall's flexibility and ability of the arms to accommodate a wide variety of filter widths. As the length-to-thickness ratio of the sidewalls decreases, the arms become more resistant to deflection in the "T" direction. The force required to spread the arms a specific distance apart increases. For a flexure adapted to hold optical filters (as the present flexures are), too great a force can crush the filter, yet too small a force will permit the filter to fall out of the flexure. For this reason, the force to spread the arms of the flexure must be carefully tailored if the machine is to accommodate a wide variety of filters having different widths without crushing them. A preferred ratio length ("L" direction) to thickness ("T" direction) ratio for the sidewalls of the flexure is therefore preferably between 25 and 300. More preferably it is between 40 and 200. Even more preferably it is between 55 and 140.

Figure 22:
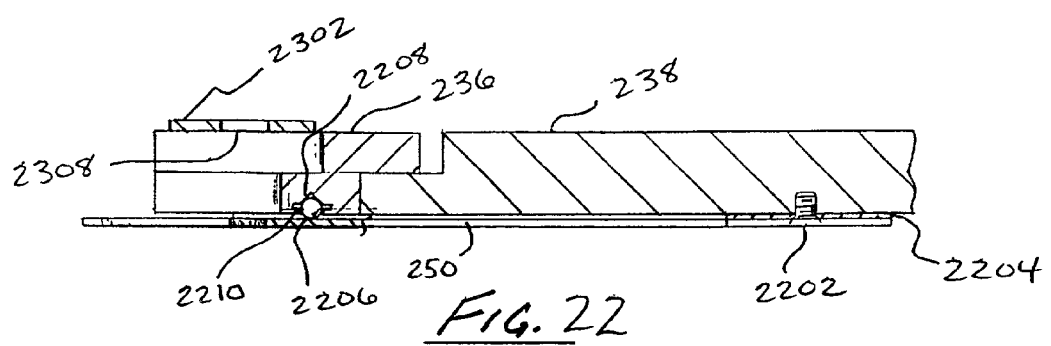
FIG. 22 is a cross sectional view of a filter nest and flexure.

In FIG. 22, a typical flexure 250 is shown in its relationship to table 238 and the particular filter nest 236 to which it is oriented. Threaded fasteners 2202 extend through the apertures 252 in the flexure and hold the flexure to table 238. The arms of the flexure extend from the table toward and underneath nest 236 in close proximity thereto. Several ball bearings 2206 are located in a linear bearing race 2208 that is formed in the bottom of the filter nest to insure that the free ends of the arms are located at a precise distance away from the bottom of the nest. As shown in phantom lines in FIG. 10A, the bearing race 2208 extends substantially perpendicular to the longitudinal extent of arms and substantially parallel to the direction the arms travel when they are deflected outwardly to receive the filter 196.

Each arm is supported on two ball bearings 2206 that are spaced apart in the bearing race 2208 by ball guide 2210. These balls rest against flat bearing surface 2212 located on the back of each arm. When the arms are deflected outward, spreading them to receive the filter, the ball bearings roll in the race as well as across bearing surface 2212 to keep the arms at a constant angular relationship with respect to each other and to keep them in the same plane. The flexure and the table are preferably dimensioned such that the flexure, when attached to the table, preloads the flexure arms against the ball bearings. In this manner, the flexures make good contact with the ball bearings, and the preload further reduces the likelihood that they will be lifted up away from the bearings when the arms are spread apart to receive the filter.

Reference is next directed to FIGS. 3, 9A, 9B, 12 and 26 to discuss an actuator assembly 264 for the flexure 250 discussed above. The flexure actuator assembly 264 is fixedly mounted on pneumatically actuated linear stage 266. This stage is moved in a linear direction by a pneumatic cylinder integral to stage 266 (not shown). Stage 266, in turn, is mounted on flexure actuator cylinder base 500. Base 500, in turn, is adjustably fixed to plate 502. Plate 502 is coupled to the output side of linear motor 510, which in turn is fixed to base 103.

Linear motor 510 is configured to translate plate 502 in the "X" direction. The components mounted on plate 502 are similarly translated in the "X" direction whenever linear motor 510 moves. Translating stage 266 moves flexure actuator assembly 264 in the "Y" direction (i.e. toward and away from a flexure) when air under pressure is applied to translating stage 266.

Figure 9B:
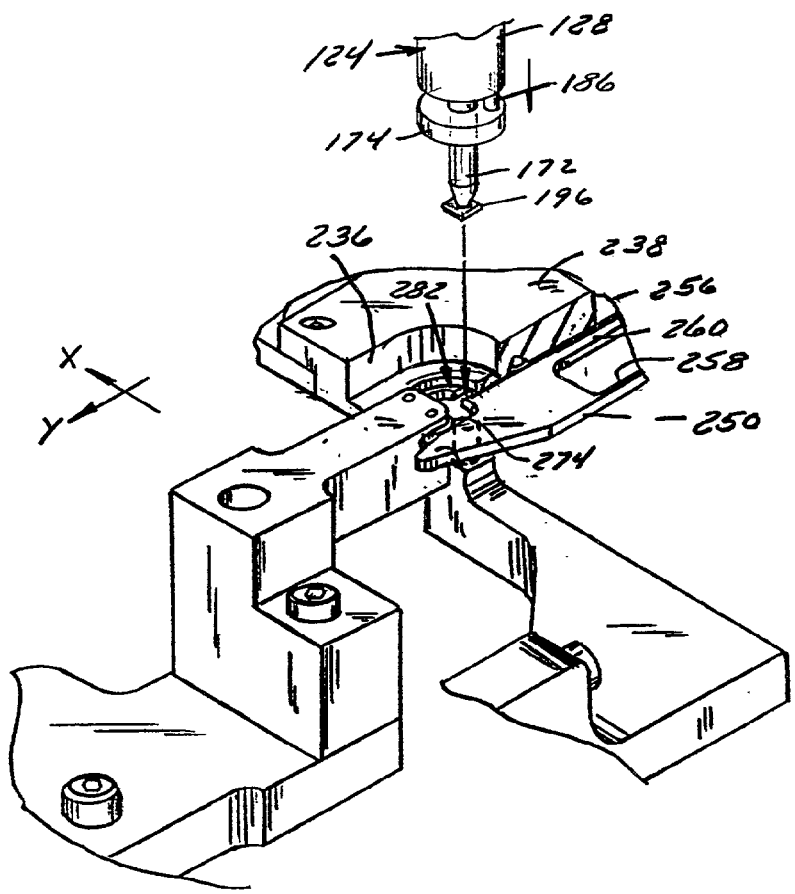
Figure 11:
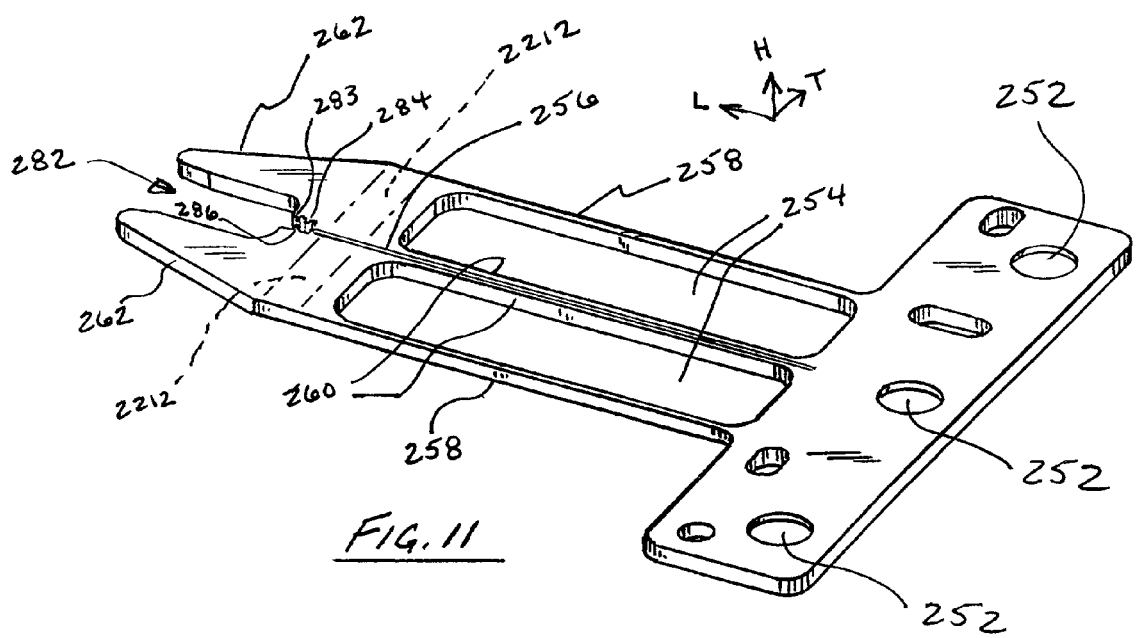
FIG. 11 is a perspective view of an element or component of the invention and which is shown in FIGS. 9A and 9B, on an enlarged scale relative thereto.
Figure 13:
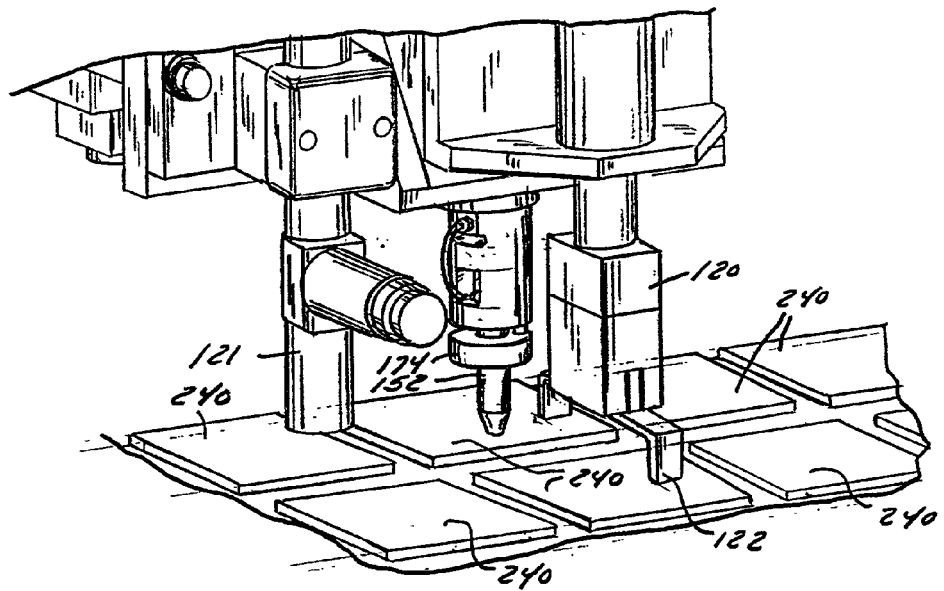
FIG. 13 is a partially-fragmented perspective view, depicting yet other elements or components of the invention shown in FIG. 3, on an enlarged scale relative thereto.

The flexure actuator 264 includes a pair of spaced-apart rollers 274 rotatably mounted on an upper portion 276 (FIGS. 10A and 10B) of L-shaped member 269. By design, the rollers 274 move in a plane coinciding with a forward planar portion 280 (FIG. 10B) of flexure 250 that defines the jaws 262. Also, the spacing of the rollers 274 is such that the rollers 274 cause the jaws 262 of flexure 250 to spread apart slightly, which in turn laterally opens the flexure's longitudinal slit 256 slightly, after the rollers 274 are first aligned with the jaws 262 (FIG. 10A) and thereafter brought into engagement with the jaws 262 (FIG. 10B) by operation of pneumatic cylinder 270, as shown in FIG. 9B. Also by design, the L-shaped member 269 is so spaced in the "Z" direction relative to the nest 236 of processing table 238 as to achieve such an effect.

Figure 10B:
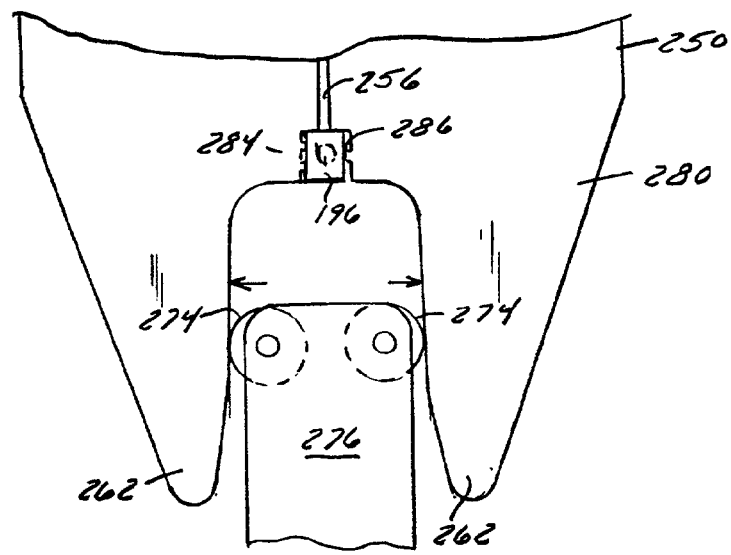

For grasping a single optical filter 196, the forward portion 280 of the flexure 250 defines a gap 282 (FIG. 10A). The gap 282 is bounded on one side by two adjacent fingers 283 and 284 that extend inwardly into gap 282 from one jaw 262 of the flexure and on the other side by another finger 286 that extends inwardly into gap 282 from the other jaw 262 of the flexure. The gap 282 is dimensioned relative to a single optical filter 196 to permit such optical filter 196 (when disposed in the plane of the forward portion 280 of flexure 250) to fit snugly into the gap 282, after the jaws 262 have been spread slightly (as shown in FIG. 10B), and thereafter to be held in place in the gap 282 by fingers 283 and 284 and the finger 286 after the flexure actuator assembly 264 is retracted from the flexure 250. By providing these three points of contact, the filter is gripped consistently at three points on the centerline of the filter: two points on one side of the (typically rectangular) filter and one point on the opposing side of the filter. This three-point contact assures accurate positioning and location of the filter and tolerates slight variations in straightness of the opposing sides it contacts.

In addition to supporting and positioning flexure actuator assembly 264, linear motor 510 also supports and positions a vacuum post 512. This post is positioned underneath gap 282 before filter 196 is inserted into gap 282. The post is positioned underneath filter 250 and adheres to filter 196 using a vacuum applied to a hole that extends through the post 512 to a vacuum port 513. A vacuum is selectively applied to port 513 under computer control to provide or remove a vacuum at the top of post 512. Without this post, the flexure arms might knock the filter off the bottom of vacuum probe 152 as they move in to contact and support filter 196.

Post 512 is configured to be raised and lowered slightly during the positioning process. It is lowered under computer control whenever linear motor 510 moves in the "X" direction from flexure to flexure in order to clear the lower surfaces of the flexures and of the rotary processing table 238 to which they are attached. Since post 512 is positioned so closely to the bottom of the flexures whenever a filter is inserted into a flexure, it is necessary in this embodiment to provide some up-and-down motion of post 512 while motor 510 moves to prevent the post from damaging the table or the other flexures.

The post is fixed to post support 514. Post support 514, in turn is fixed to post mount 516 with a conventional screw fastener and two dowel pins. Post mount 516, in turn, is fixed to insulator block 518 by conventional screw fasteners and dowel pins. Insulator block 518, in turn is fixed to the output side of a precision linear stage 520. Linear stage or actuator 520 generally includes an integral pneumatic actuator (not shown) that is operated by a supply of compressed air selectively applied to hose fittings 522. The two hose fittings permit the output side of actuator 520 to be moved up or down (i.e. in the "Z" direction) with respect to the input side of actuator 520 by selectively applying air under pressure by computer control to one or the other of fittings 522.

The fixed side of actuator 520 is fixed to post base 526, which in turn is fixed to plate 502. As explained above, plate 502 is fixed to move in the "X" direction with linear motor 510. Thus, both the flexure actuator and post 512 translate together with linear motor 510. Flexure actuator 264 can be moved in and out (toward or away) from the flexure 250 in the "Y" direction and post 512 can be moved up or down (toward or away) from gap 282 of the flexure in the "Z" direction.

As mentioned, the head 124 is used to precisely place a single optical filter 196 into the gap 282 of each flexure 250, as illustrated by FIG. 9A. In general, the flexure actuator assembly 264 is moved relative to the rotary processing table 238 (FIG. 12) by linear actuator 510 to line up the rollers 274 of the flexure actuator assembly 264 with another flexure 250 that is not yet provided with an optical filter 196 (as depicted in FIG. 10A).

In an initial position, both the actuator assembly 264 and the post 512 are moved away from table 238 and flexures 250. In this position, both the actuator assembly 264 and the post 512 will not mechanically interfere with table 238 and flexures 250.

Linear motor 510 is then energized to move both of assembly 164 and post 512 in the "X" direction until they are positioned adjacent to a particular flexure 250.

At this point, the actuator assembly is moved forward in the "Y" direction to engage and spread the flexure arms. Post 512 is moved upward (in the "Z" direction) until post 512 is positioned just below gap 282. The order in which these two steps occur is not critical.

The "X" and "Y" gantries are energized to move head 124 until probe 152 (holding filter 196 by vacuum) is located directly above gap 282. Once in position, the "Z" stage is energized to move probe 152 downward toward gap 282. As the "Z" stage is lowered, filter 196 will engage post 512 and stop moving. Probe 152 will collapse slightly as described above regarding the operation and construction of head 124. The "Z" stage is then stopped with the filter held firmly between post 512 and probe 152. Vacuum is applied to post 512. The vacuum applied to probe 152 is released and head 124 is lifted up and away from the filter.

Once the filter is held in place between the two flexure arms, the flexure actuator assembly is withdrawn away from the flexure causing the flexure arms to move together and grip the edges of the filter with the three fingers extending from opposing sides of the arms.

The vacuum applied to post 512 is released and post 512 is lowered away from the filter.

At this stage, a new filter has been inserted into an empty flexure and both the post 512 and flexure actuator assembly 264 have been withdrawn away from flexure 250 and table 238. Linear motor 510 can then be energized to move the flexure actuator assembly and the post to another flexure in order to insert another filter at the new flexure.

The above-described procedure is repeated until all four flexures 250 (each in a respective nest 236) located on one side of the processing table 238 are provided with an optical filter 196 that is to be tested.

Once the filters 196 have been tested (a process to be described below) they are similarly removed from the flexures in the following manner. First, the linear motor 510 moves the flexure actuator assembly until it is adjacent to the flexure to be unloaded. At substantially the same time, probe 152 is moved downward using the "Z" stage until it contacts and holds the filter in that flexure by application of a vacuum to the probe tip. Once the probe has gripped the filter, the flexure actuator assembly is advanced until it spreads the flexure arms apart. Once spread, the filter is supported by the probe alone, which is then raised by its associated "Z" stage Attention is next directed to FIGS. 7, 12, 23, and 24 for discussing one particular aspect or feature of the present invention, referred to as a "compactness" feature. In this regard, the rotary processing table 238 is one of several elements or components of a rotatable assembly 288 which shall now be described. Rotatable assembly 288 includes a rotary stage frame 600 that is fixed to base 103 and supports rotatable shaft 602 on bearings 604. A rotary adapter 606 is fixed to the bottom of frame 600. Adapter 606 is also fixed to rotary actuator 608. An actuator shaft 610 extends from actuator 608 and is rotated by pneumatic actuators 612 and 614. The linear motion provided by these pneumatic cylinders is converted to rotary position by an internal gear arrangement (not shown). A preferred rotary actuator is model number RLS-I-32×180°-NB-U4 manufactured by PHD. This actuator rotates a nominal 180 degrees both in a clockwise and in a counter-clockwise direction. Air is supplied to actuator 608 by pneumatic tubing 616 coupled to the pneumatic ports of the actuator. One skilled in the art understands that the rotary processing table 238 may be made to rotate through its 180° span of motion under the control of a servomotor (not shown), rather than via pneumatic control.

A flexible coupling 618 is attached to both the rotary actuator shaft 610 and to rotary shaft 602 to permit slight misalignment of the two rotatable shafts. Shaft 602 extends upward through frame 600 and terminates in a mounting flange 622. This flange is fixed to table 238 using standard threaded fasteners.

When air under pressure is supplied to one port of actuator 608, it rotates clockwise approximately 180 degrees. Since the actuator is rotationally coupled to table 238, table 238 also rotates clockwise about 180 degrees.

When air under pressure is applied to the other port of actuator 608, the actuator rotates counter-clockwise approximately 180 degrees. Since the actuator is rotationally coupled to table 238, table 238 also rotates counter-clockwise about 180 degrees.

The actuator assembly needs to rotationally position the table to within a few thousandths of an inch to insure that the filters are accurately positioned with respect to the goniometers in the goniometer station. Since the actuator selected for use cannot rotate to that degree of accuracy, additional components have been incorporated into the actuator assembly to provide this precise positioning.

Frame 600 includes a cylindrical portion 624 in which the bearings 604 and shaft 602 are mounted. In addition, it includes a stop block 626 fixed to cylindrical portion 624 by conventional threaded fasteners. Stop block 626 does not rotate with table 238 and shaft 602, but is fixed with respect to base 103.

Adjustable rotation stops 628 and 630 are threadedly engaged with stop block 626. These stops serve to limit the rotation of table 238 by engaging mating surfaces on stop block 640 that is fixed to the bottom of table 238. When stop 628 abuts stop block 640, table 238 stops rotating in one direction. When stop 630 abuts stop block 640, table 238 stops rotating in the other direction.

Rotatable assembly 288 also includes a first sensor 636 that generates a signal when stop 628 abuts stop block 640 and a second sensor 638 that generates a signal whenever stop 630 abuts block 640. Sensors 636 and 638 are actuated whenever sensor flags 632 and 634 interrupt a light beam passing between the opposing arms of the sensors.

Figure 25:
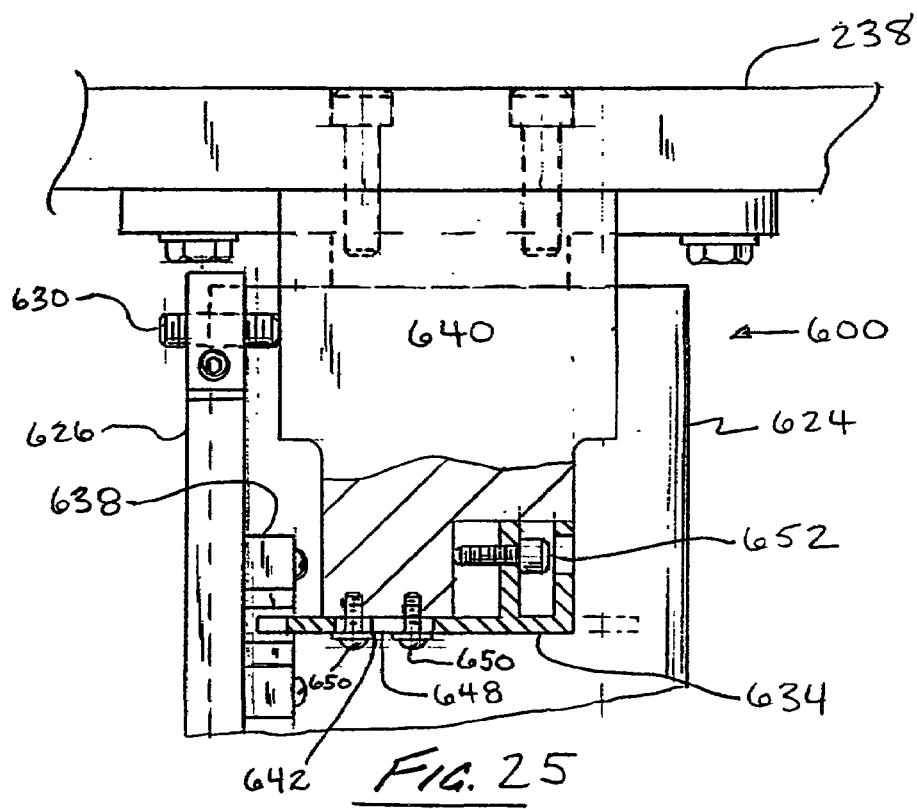
FIG. 25 is a side view of the rotating table of FIG. 24 showing the stop block and features of the limit switches and their actuating flags.
Figure 26:
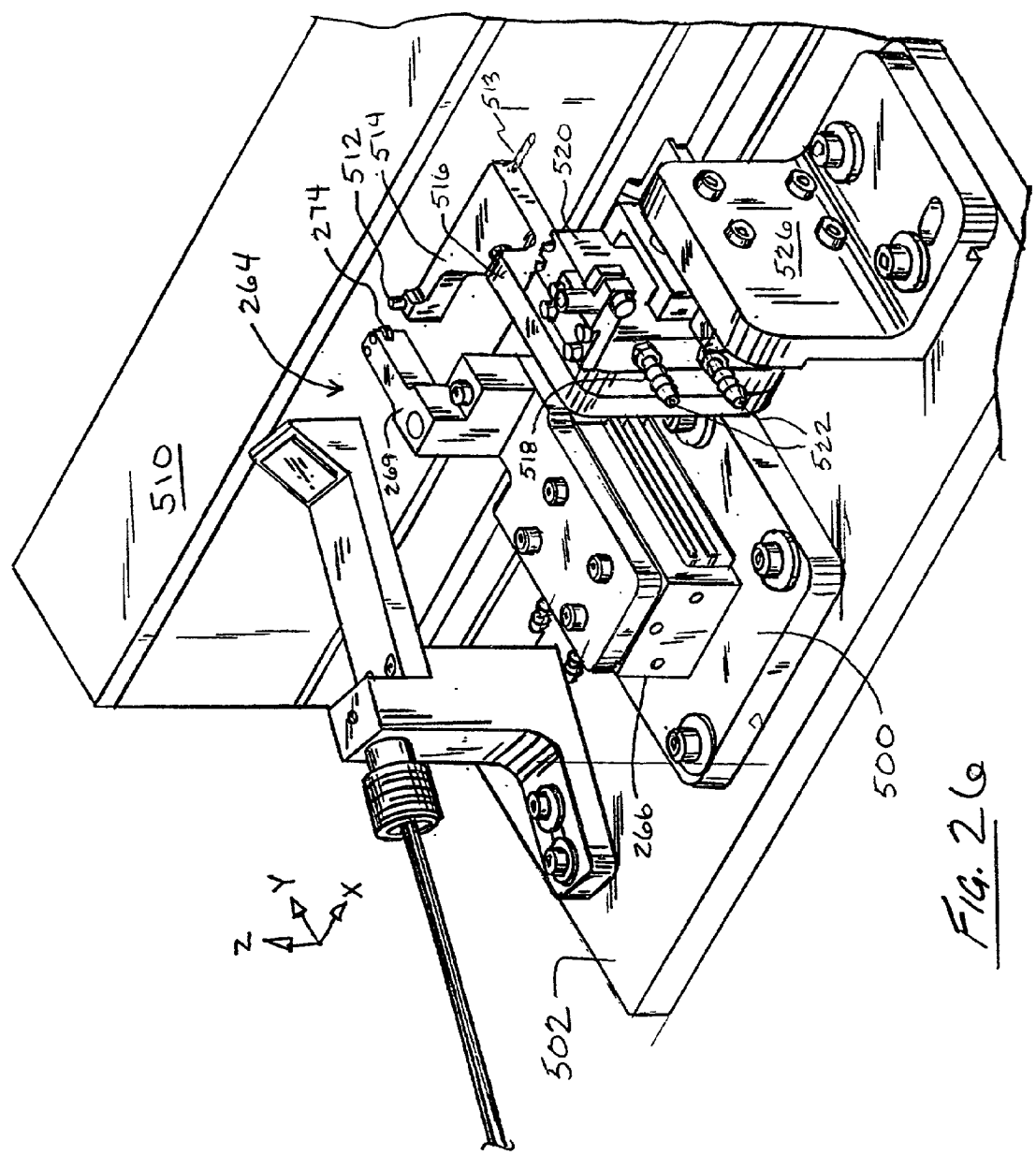
FIG. 26 is a perspective view of the flexure actuator and the vacuum post.

Sensor flags 632 and 634 are fixed to stop block 640, which in turn is fixed to the underside of table 238. FIG. 25 is a partial cross-sectional view of block 640 showing the configuration of flag 634 and its relationship with sensor 638. Flag 632 is arranged identically in block 640 but extends in the opposite direction to engage sensor 636.

Each of flags 632 and 634 fit into corresponding and adjacent slots 642 formed in the bottom of stop block 640. Each of flags 632 and 634 has elongated slots 646 through which flag mounting fasteners 650 extend. The ends of fasteners 650 are threaded into stop block 640 such that they bind with flags 632 and 634, and fix them to stop block 640. By loosening the fasteners, flags 632 and 634 can be slid back and forth inside their corresponding slots 642.

Each of flags 632 and 634 has a threaded adjusting screw 652 that permits the accurate and incremental positioning of each stop with respect to stop block 640. The threaded ends of fasteners 652 abut stop block 640.

The position of either of the stops is adjusted by rotating its fastener 652 once fasteners 650 holding that flag to block 640 are loosened. As fastener 652 is rotated, it moves its flag in its slot 642. Once the flag is in its the proper position, its fasteners 650 are tightened to lock it in that position.

In this manner, the position of the sensor flags can be adjusted, and therefore the signal sent by the sensors to the computer indicating that the table is in the proper rotational position can also be adjusted. By providing these sensors and their associated flags, their signals are provided to the computer which thereby knows when the table (1) is in a first rotational position in which a first set of four flexures is disposed for loading and unloading and a second set is disposed for testing, or (2) is in a second rotational position in which the first set of flexures is disposed for testing and the second set is disposed for loading and unloading, and (3)

is in a range of third rotational positions between the first two rotational positions in which no testing, loading or unloading should be done.

Attention is next directed to FIGS. 14–18, to discuss the goniometer station 300 mentioned above. Preferably, two-axis goniometers are used; and a particularly preferred goniometer measures less than two inches (five centimeters) wide, less than seven inches (about eighteen centimeters) long, and less than four inches (ten centimeters) high. For compactness purposes, goniometers taking up less volume would be even more preferred. The illustrated goniometers can be placed on two-inch (five-centimeter) centers with no interference, within the total travel envelope of each axis, between adjacent goniometers. The lower axis provides ±6° of travel, while the upper axis provides ±5°. The resolution of the upper axis is approximately 0.0007° while that of the lower axis is approximately 0.0005°. Actual accuracy for both axes is about ±0.0035°. Both axes are controlled by a commercially-available closed-loop servo system using brushless DC (direct current) servomotors and linear encoders. For each axis, commercially-available solid-state optical limit switches are employed to signal the end of travel/home positions.

Figure 14:
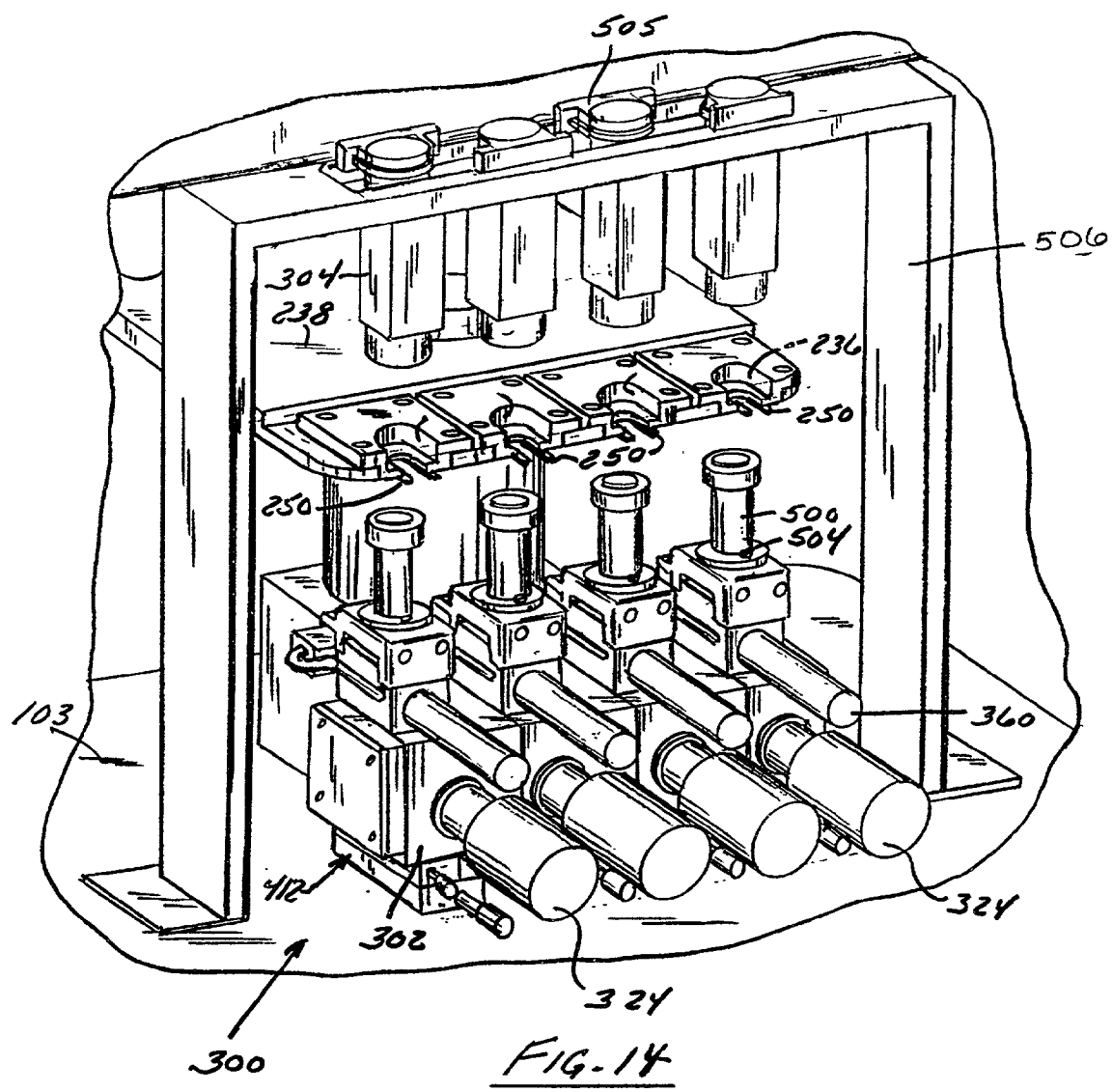
FIG. 14 is a partially-fragmented perspective view depicting yet another aspect or feature of the present invention which appears in the background in FIG. 3.

As will become apparent, the total number and spacing of adjacent nests 236 on process table 238 is, in general, determined by the total number and volume occupied by the goniometers incorporated into the apparatus of the invention. As was mentioned above, after all four filter nests 236 are individually provided with a single optical filter 196, the process stage 238 is rotated a full 180° (FIGS. 3 and 12) for optical filter-testing purposes, to cause each such nest 236 to be precisely positioned between a goniometer 302 and an associated optical detector 304, as is illustrated in FIG. 14.

Figure 15:
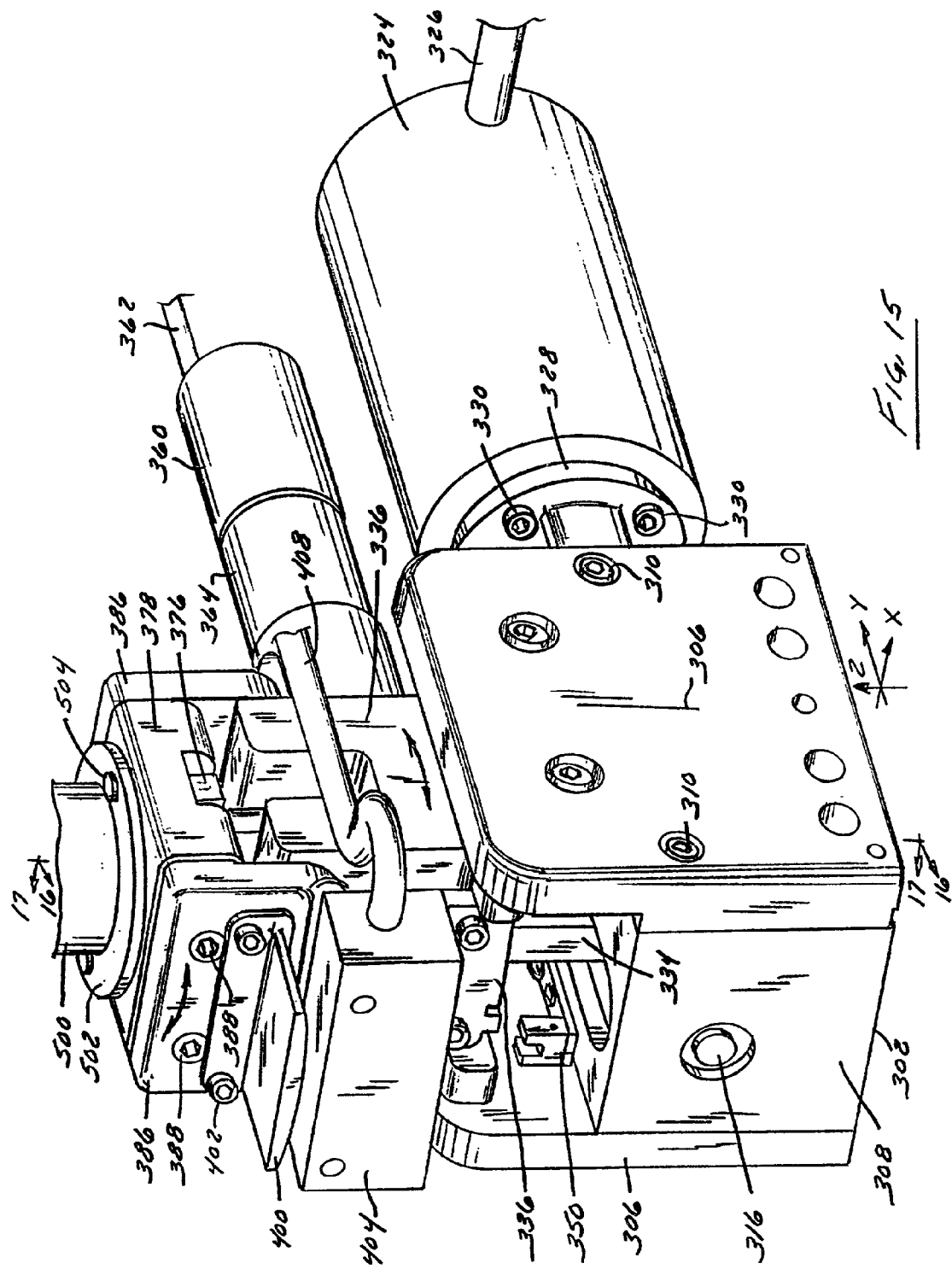
FIG. 15 is a partially-fragmented perspective view of a preferred embodiment of the aspect or feature shown in FIG. 14, on an enlarged scale relative thereto.
Figure 16:
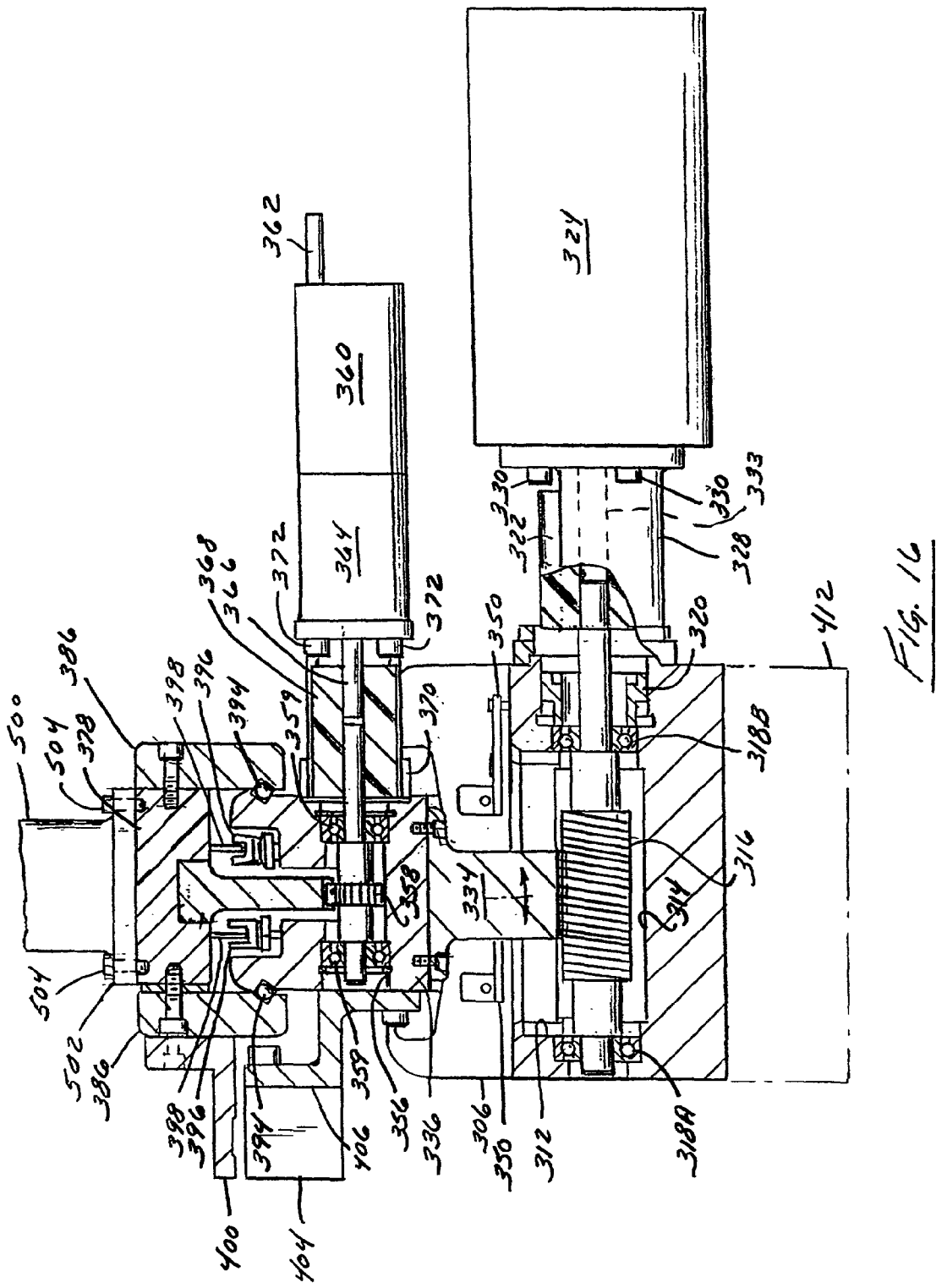
FIG. 16 is a partially-fragmented side elevational view, taken generally along the plane 16—16 in FIG. 15.
Figure 17:
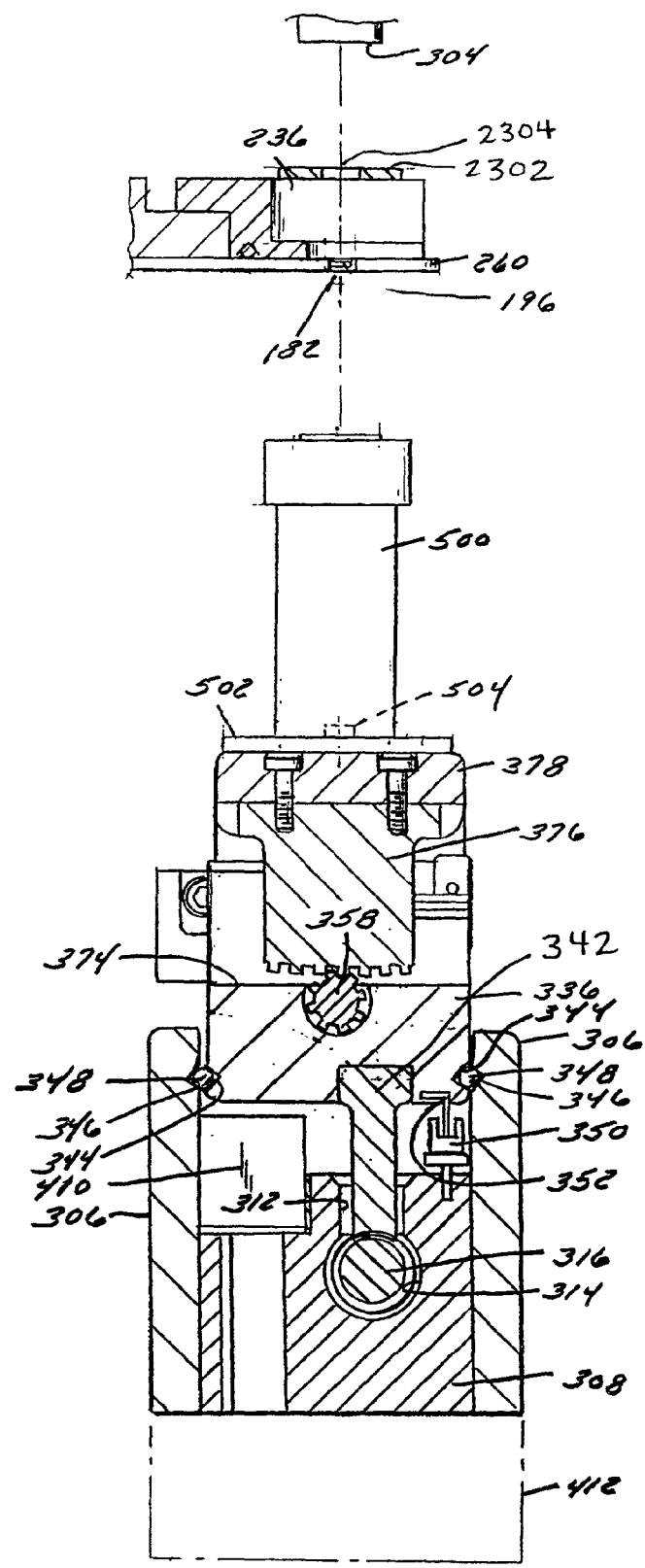
FIG. 17 is a partially-fragmented side elevational view, taken generally along the plane 17—17 in FIG. 15.

Referring to FIGS. 15–17, each goniometer 302 includes a pair of spaced-apart apertured base plates 306 between which a channeled guide member 308 is both sandwiched and fixedly mounted in a conventional manner. In particular, conventional threaded fasteners 310 (FIG. 15) are used to releasably fix the base plates 306 and the guide member 308 together. The guide member 308 defines a generally elongated channel 312 as well as a generally-cylindrical longitudinally disposed through bore 314 communicating with the channel 312, as is shown in FIGS. 16 and 17. A conventional elongated worm-gear shaft 316 is rotatably mounted via conventional spherical bearings 318A and 318B (FIG. 16) in the generally cylindrical through bore 314 in a conventional manner.

In particular, the outer bearing 318B, rotatably carrying one end portion of the worm-gear shaft 316, is removably retained within the generally-cylindrical through bore 314 via a conventional spanner nut 320 (FIG. 16) which is removably threadedly joined to the channeled guide member 308 via intermeshing threads (not shown) in a conventional manner. The inner bearing 318A, rotatably carrying the opposite end portion of the worm gear shaft 316, is removably urged via an end portion of the worm-gear shaft 316 (as is illustrated) into abutting engagement with an annular shoulder that is defined by the channeled guide member 308, which annular shoulder is concentric with the generally-cylindrical bore 314, as is shown in FIG. 16. The outer end of the worm gear shaft 316 (at bearing 318B) is non-rotatably (yet removably) fixed to a flexible coupling 322 that is driven by a commercially available lower axis DC motor 324. The lower-axis DC motor 324, which is provided power via a conduit 326, is mounted on the channeled guide member 308 via an axially channeled motor mount 328. In particular, the lower axis DC motor 324 is releasably mounted on the motor mount 328 in a conventional manner using threaded fasteners 330 (FIGS. 15 and 16). The motor mount 328 is removably affixed to the channeled guide member 308 via threaded fasteners (not shown) in a similarly conventional manner. The lower-axis DC motor 324 includes a rotatable motor shaft 332 (FIG. 16) on which the flexible coupling 322 is non-rotatably (yet removably) mounted. In this regard, the axially disposed channeling of the motor mount 328 is so dimensioned relative to the external surfaces of the flexible coupling 322 such that the flexible coupling 322 is able to rotate relative to the motor mount 328 with no interference between the flexible coupling 322 and the motor mount 328.

A "tip" feature of the illustrated goniometer 302 shall now be discussed. A worm gear-driven platform 334, having a lower end portion disposed into the elongated channel 312 of the guide member 308, defines a threaded bottom portion that intermeshes with the worm-gear threads on shaft 316, as shown in FIG. 16. A grooved guide member 336 (FIG. 17A), spaced above the channeled guide member 308 (FIGS. 16 and 17), is mounted on top of the driven platform 334 (FIG. 16).

Figure 17A:
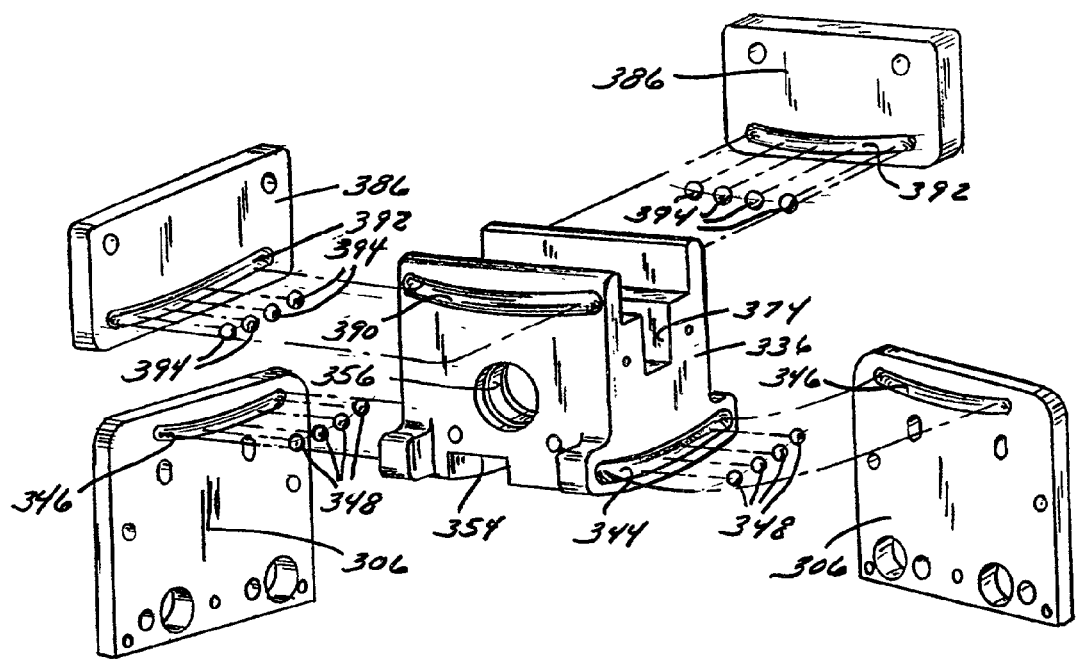
FIG. 17A is an auxiliary view, in exploded perspective, taken from the backside of FIG. 17 and depicting some features or aspects not otherwise seen in FIG. 17.

Spaced-apart lower portions of the grooved guide member 336 define an arcuate groove 344, one of which is shown in FIG. 17A; and inwardly-disposed upper surface portions of apertured base plates 306 respectively define grooves 346 of complementary arcuate curvature into which conventional spherical bearings 348 (FIGS. 17 and 17A) are disposed. Spaced-apart optical limit switches 350, operably connected to the lower-axis DC motor 324, are fixedly mounted in an upper surface of the channeled guide member 308 (FIGS. 15–17); and an optical limit-switch flag 352 (FIG. 17) which is fixedly carried by the grooved guide member 336, and which is adapted for engagement with one of the limit switches 350 in a conventional manner, is operably disposed therebetween.

In operation, activation of the lower axis DC motor 324 powers and causes rotation of the worm-gear shaft 316 which, in turn, causes movement of the worm gear-driven platform 334 to the left or right, as shown in FIG. 16. While such motion of the worm gear-driven platform 334 is linear relative to the channeled guide member 308, the resultant relative motion between the grooved guide member 336 and the channeled guide member 308 is arcuate, because movement of the grooved guide member 336 is tied to the worm gear-driven platform 334 via the dowel pin 342 (FIG. 17) and is guided by the arcuate grooves 344 and 346 (FIG. 17A) and ball bearings 348 therein.

A "tilt" feature of the illustrated goniometer 302 shall now be discussed. An underside surface of the grooved guide member 336 defines a generally rectangular channel 354 (FIG. 17A) into which the driven platform 334 is disposed (FIG. 17); and an intermediate portion of the grooved guide member 336 defines a generally cylindrical through bore 356 (FIG. 17A) into which a spur-gear shaft 358 (FIGS. 16 and 17) is longitudinally disposed. The spur-gear shaft 358 is rotatably mounted in spaced-apart bearings 359 (FIG. 16) longitudinally mounted within the cylindrical through bore 356 of the grooved guide member 336.

An upper axis DC motor 360, provided electrical power in a conventional manner via a conduit 362, is removably operably connected in a conventional manner to a gearbox 364 having an output shaft 366 operably connected to spur-gear shaft 358 via a flexible coupling 368. A hollow motor mount 370 (FIG. 16), within which flexible coupling 368 is freely rotatable, is removably affixed to grooved guide member 336 via threaded fasteners (not shown), and has gearbox 364 removably mounted thereon (FIG. 16) in a conventional manner via threaded fasteners 372.

An upper surface of grooved guide member 336 defines an elongated slot 374 (FIG. 17A); and a spur gear-driven platform 376 (FIGS. 16 and 17), longitudinally disposed in the slot 374 (FIG. 17) has a lower portion which defines threads that intermesh with the threads of the spur-gear shaft 358. Mounted on the spur gear-driven platform 376 is a grooved tilt-axis mount 378 (FIGS. 16 and 17).

Spaced-apart tilt-axis side plates 386 have the tilt-axis mount 378 removably affixed therebetween (FIGS. 15 and 16) via conventional threaded fasteners 388. Spaced-apart upper portions of the grooved guide member 336 define an arcuate groove 390, one of which is shown in FIG. 17A; and inwardly-disposed lower surface portions of the tilt-axis side plates 386 respectively define grooves 392 of complementary arcuate curvature into which conventional spherical bearings 394 (FIGS. 17 and 17A) are disposed. Spaced-apart optical limit switches 396, operably connected to the upper-axis DC motor 360, are fixedly mounted in an upper surface of the grooved guide member 336 (FIG. 16); and a pair of limit-switch flags 398 which are fixedly carried by the grooved tilt-axis mount 378, and which are adapted for engagement with corresponding ones of the limit switches 396 are operably disposed therebetween.

In operation, activation of the upper-axis DC motor 360 powers and causes rotation of spur-gear shaft 358 which, in turn, causes movement of the spur gear-driven platform 376, generally to the left or right (FIG. 17) along an arcuate path that is defined by the interaction between balls 394 as they roll in grooves 390 and 392. These balls and grooves together constrain the tilt-axis to rotate about an axis located at the top of the goniometer.

In particular, balls 394 and grooves 390 and 392 in which they roll have been configured to rotate the tilt_axis portion of the goniometer (including collimator 500) about an axis that is in the plane of the lower surface of a filter loaded into the flexure immediately above the goniometer. As a result, when motor 360 rotates, the tilt-axis pivots about an axis that is parallel to the "Y" vector that defines the "Y" direction.

Whenever the lower motor 324 is engaged, it rotates the worm gear shaft, which engages platform 334. As in the example of motor 360, above, this causes the platform 334 and all the components mounted on it, including guide member 336, motor 360 and collimator 500 mounted on member 336 to similarly rotate. In the case of motor 324, however, this rotation is constrained by balls 348 that travel in grooves 346 and 344. Since this ball and groove arrangement is orthogonal to the ball 394 and groove 392 arrangement located on the upper portion of the goniometer, the motion caused by motor 324 is orthogonal to that of motor 360.

As in the case of motor 360, above, balls 348 and grooves 344 and 346 in which they roll are configured to rotate the platform 334, the grooved guide member 336 and all components mounted on it (including collimator 500) about an axis that is in the plane of the lower surface of a filter loaded into the flexure immediately above the goniometer. As a result, when motor 324 rotates, these components pivot about an axis that is parallel to the "X" vector that defines the "X" direction. This vector is orthogonal to the "Y" vector.

Summarizing, when motors 360 and 324 rotate to drive the goniometer, the upper portions of the goniometer pivots about two orthogonal pivotal axes that are in the plane of the lower surface of a filter mounted in the flexure immediately above that goniometer.

In this manner, the goniometer can be tilted to provide a specific angular orientation of the collimator with respect to a planar surface of the filter, while at the same time keeping the collimator pointed at the surface of the filter. As we will discuss below, each goniometer is provided with translating "X" and "Y" stages that move the goniometer in the "X"–"Y" plane while not changing the angular orientation of the goniometer with respect to a surface of its corresponding filter.

In this manner, the light beam transmitted by the collimator through the filter can be separately and independently adjusted both (1) angularly (i.e. without changing the point of incidence of the light on the surface of the filter), and (2) translationally across the surface of the filter (without changing the angular orientation of the incident light beam with respect to the filter).

It will therefore be appreciated by those skilled in the art, because the plural goniometers 302 are operably disposed upwardly toward associated optical detectors 304 (FIG. 14), that the two-axis "tilt" and "tip" features, which are thus provided by the lower-axis and upper-axis DC motors 324 and 360 (FIG. 15), will enable the operative end of each goniometer 302 to "track" along an arcuate path in the "X" plane as well as along an arcuate path in the "Y" plane, simultaneously, where the center of each such arcuate path is spaced above the goniometer 302, which is a result of the grooves 344 and 346 in the guide member 336 and the spaced-apart lower side plates 306 as well as the grooves 390 and 392 in the guide member 336 and the spaced-apart upper side plates 386, as shown in FIG. 17A.

A scale mount 400 (FIGS. 15 and 16) is fixed to the tilt-axis side plates 386 via threaded fasteners 402 for mounting an optional optical scale (not shown). An upper axis (tilt) encoder 404 (FIGS. 15 and 16) for optically detecting the optical scale in order to determine the degree of tilt of the upper stage, is fixedly-mounted in a conventional manner to an upper encoder bracket 406 (FIG. 16) which, in turn, is mounted in a conventional manner on the grooved guide member 336. An encoder cable 408 (FIG. 15), is operably connected to the upper axis (tilt) encoder 404. A lower axis (tip) encoder 410 (FIG. 17), disposed between the lower axis base plates 306, is for detecting the degree of tip.

Figure 18:
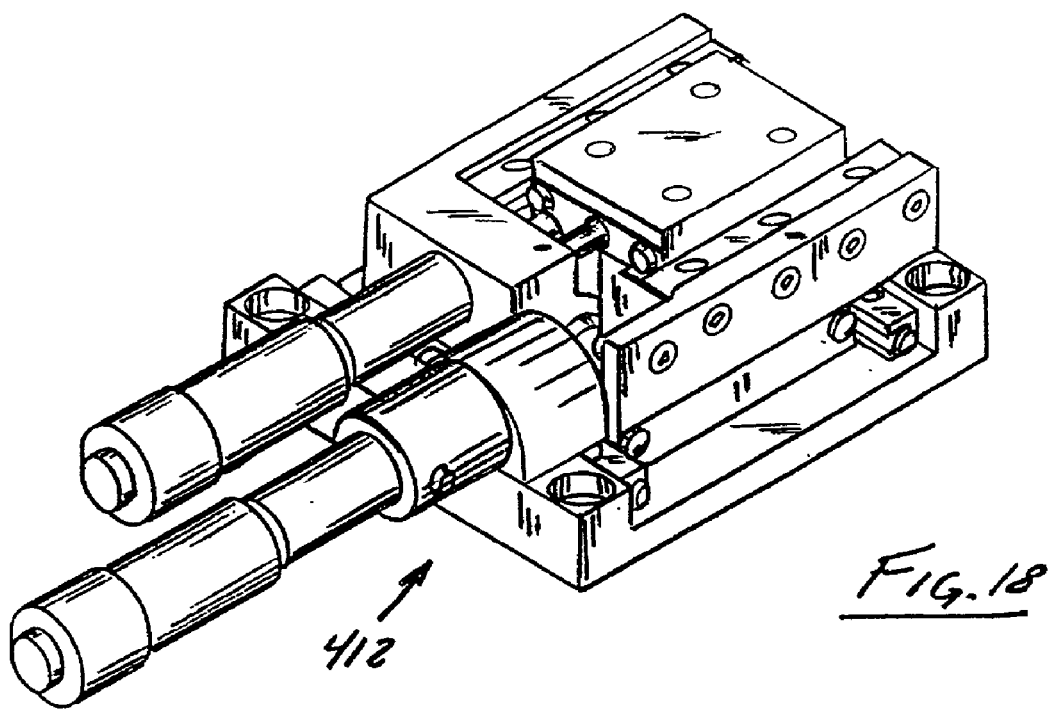
FIG. 18 is a perspective view of a translation assembly shown in FIG. 14, on an enlarged scale relative thereto.

Referring to FIG. 18, each goniometer 302 (FIG. 14) is mounted on a separate X–Y translation stage 412, which allows each goniometer 302 to translate in both the "X" and "Y" directions in a plane that is horizontal to the base 103.

Each goniometer 302 includes an associated collimator 500 (FIGS. 14–17) having a base 502 (FIG. 15) that is fixed to the tilt-axis mount 378 via conventional fasteners 504. For each goniometer 302, the associated collimator 500 is disposed generally upwardly, toward a corresponding nest 236 on the rotary processing table 238, as is shown in FIG. 14. Also, for each goniometer 302 there is an optical detector 304 which is optically facing its associated goniometer 302 and spaced sufficiently vertically above its associated collimator 500 as to permit the processing table 238 to rotate therebetween (in the manner described above), to present a single optical filter 196, which is held in a single associated nest 236 of the processing table 238 by the forward portion 280 of the associated flexure 250 (FIG. 10B), for optical filter testing. The associated optical detectors 304, disposed above the rotary processing table 238 and optically facing each respective one of the filter nests 236, are affixed with fasteners 505 in a conventional manner to a transverse frame 506 (FIG. 14) supported by the base 103.

For each goniometer 302, the associated lower-axis DC motor 324 as well as the associated upper-axis DC motor 360 are together operated to cause the goniometer 302 to "tilt" and/or "tip" (as described above) so that the associated collimator 500 may be directed precisely at the single corresponding optical filter 196 that is to be tested.

In general, laser light from a conventional tunable laser source coupled to each collimator 500 is directed toward the lower surface of a filter 196. This laser light is reflected off the lower surface of filter 196 if the wavelength of the light is a non-accepted wavelength. If the light is at an accepted wavelength, it is transmitted through the filter and impinges upon associated optical detector 304. Detector 304 converts that incident light energy into an electrical signal, which is fed to the system.

Light at wavelengths that are not accepted (i.e. reflected) by filter 196 is reflected by the optical filter 196 and passes back through the collimator 500 into light circulator 616 and into power module $604_{[PC1]}$.

More particularly, in a first test step, goniometer tip and tilt are adjusted until the energy of the reflected light at a wavelength outside the accepted (i.e. transmitted) wavelengths of the filter is a maximum as measured by the power module 604.

Inherently, light energy reflected back into the collimator 500 is at a maximum when the laser beam is oriented precisely 90° relative to the surface of each optical filter 196 (i.e., precisely "normal" to the lower surface of the filter). In this regard, for each goniometer 302, the associated lower-axis and upper-axis DC motors 324 and 360 are operated to cause the light from the associated collimator 500 to be precisely normal to the surface of a single optical filter 196 that is to be tested. This requires that the goniometer 302 be able to adjust its tip and tilt by very small increments of preferably 0.007° or less.

To do this, a computer moves motor 324 in a sequence of steps, reading the intensity of the reflected light signal. After the desired alignment maximizing reflected light energy is achieved, the wavelength of light directed onto each of the filters 196 is varied in small increments within a range of wavelengths dependent on the type of filters being tested, since each filter 196 must transmit a preselected wavelength range of light as dictated by its performance specification. Filters that do not transmit the correct wavelength are rejected or classified according to their transmission characteristics.

Figure 19:
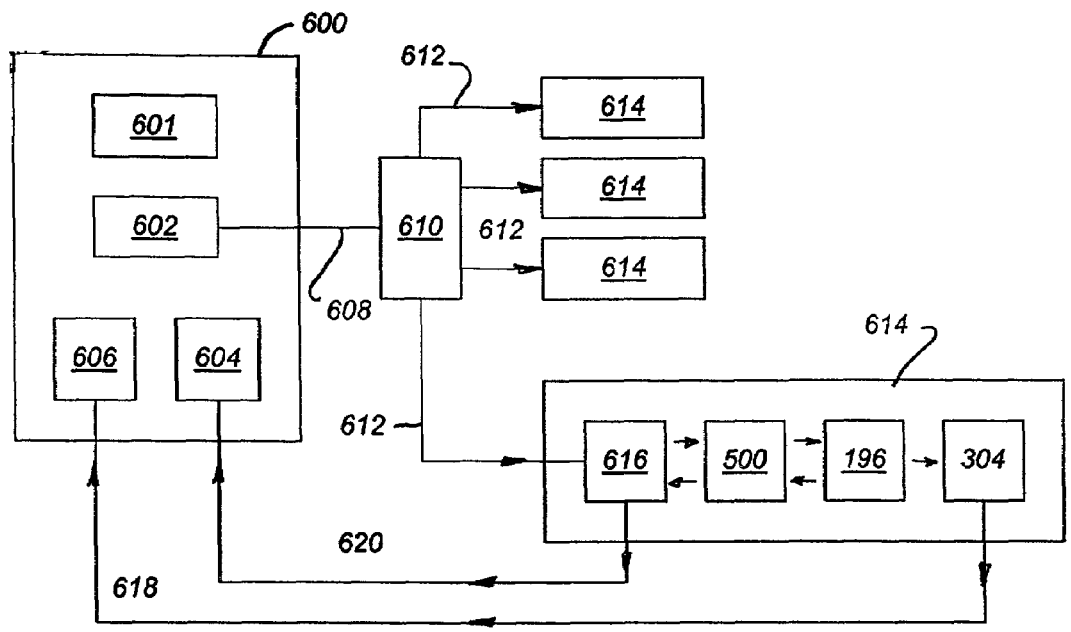
FIG. 19 is a schematic illustrating a laser beam-splitting feature of the optics design of the present invention.

Reference is next directed to FIG. 19 wherein a mainframe 600 includes a conventional tunable laser 602, a power sensor module 604 and an interface module 606, all of which are commercially available. The laser 602 is a conventional tunable laser optically coupled via a conventional fiber-optic cable 608 in a known manner to a commercially-available one-to-four (1:4) beam splitter 610, which optically splits the laser beam from fiber-optic cable 608 into four output beams, each of which is carried by a separate conventional fiber-optic cable 612 to an optical filter-testing station 614. Each such optical filter-testing station 614 includes a commercially-available reflected-light circulator 616, and one each of the collimators 500, optical filters 196 and optical detectors 304, as described above. An electrical connector 618 electrically connects in a conventional manner the optical detector 304 to the interface module 606 and an optical connector 620 optically connects via a conventional fiber optic cable the power sensor module 604 to each reflected-light circulator 616.

In operation, laser light from the laser source 602 in the mainframe 600 is passed via the fiber-optic cable 608 through the laser-beam splitter 610, which optically splits such laser light into plural (preferably four) laser-based light beams. Each such split light beam is passed via the fiber-optic cable 612 to an associated reflected-light circulator 616. From the reflected-light circulator 616, the laser beam is passed through the associated collimator 500 and is incident upon an associated optical filter 196 as above described. Reflected light from the optical filter 196 that passes back through the associated collimator 500 is received by the associated reflected-light circulator 616 and is thereafter passed via the optical connector 620 to the power sensor module 604 where its intensity is measured. The position of the collimator 500 is adjusted using motors 324 and 360 to tip and tilt the goniometer until maximum intensity of the reflected light is achieved. After alignment, the transmitted light received by the associated optical detector 304 is passed from the optical detector 304 via the electrical connector 618 to the interface module 606. The wavelength of the tunable laser scans a range of 1 to 30 nanometers in small increments, preferably ranging in incremental size between 1 and 10 picometers, both above and below the specified wavelength of the optical filter under test to measure its transmission characteristics.

Figure 20:
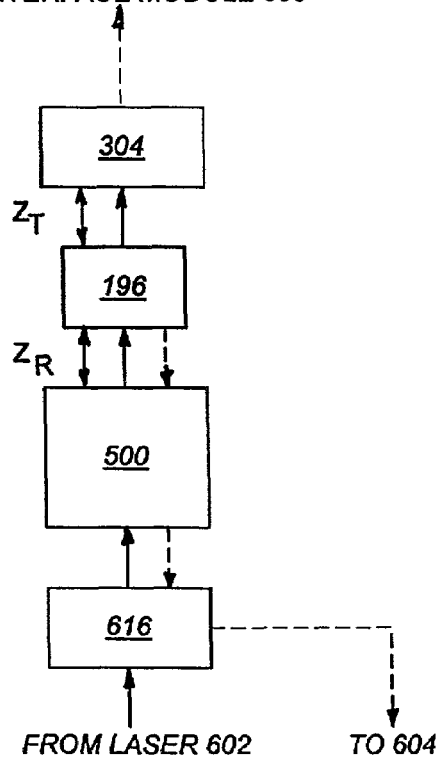
FIG. 20 is a schematic based on FIG. 19.

Reference is next directed to FIG. 20, which is a schematic showing the path of transmitted and reflected light. In FIG. 20, transmitted light from laser 602, shown as a solid line, passes through the circulator 616 and its associated collimator 500 and through an individual optical filter 196. Transmitted light from such optical filter 196 is received by the associated optical detector 304. An electrical signal, represented by the dot-and-dashed line, is passed to the interface module 606 (FIG. 19).

The optical detector 304 is spaced above its associated optical filter 196 by the distance $Z_T$, which indicates vertical transmitted-light spacing. A reflected wavefront, represented by the dashed line, is reflected by the optical filter 196 (in response to the incident transmitted light passed from collimator 500 to optical filter 196) back through the associated collimator 500 and reflected-light circulator 616. The light circulator 616 passes the reflected light (as shown by the dashed line) back to the power sensor module 604 (FIG. 19) via the optical connector 620. The filter 196 is spaced above its associated collimator 500 by the distance $Z_R$, which indicates vertical reflected-light spacing.

Referring back to FIG. 17, a filter aperture mask 2302 is disposed above filter nest 236 in the path of transmitted light to mask off stray light that passes through filter 196 before that stray light arrives at detector 304. The mask has a small circular opening or aperture 2304 through which the laser light passes to reach detector 304.

Figure 23:
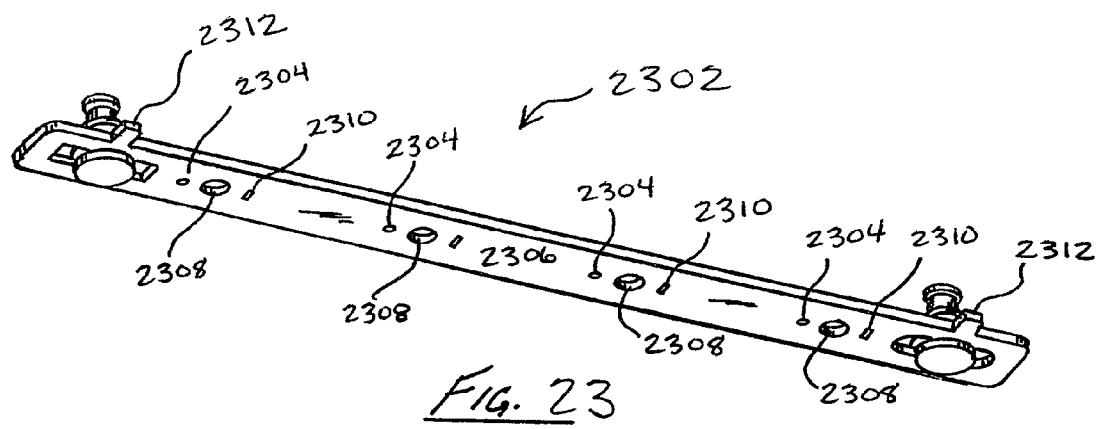
FIG. 23 is a perspective view of an aperture mask.
Figure 24:
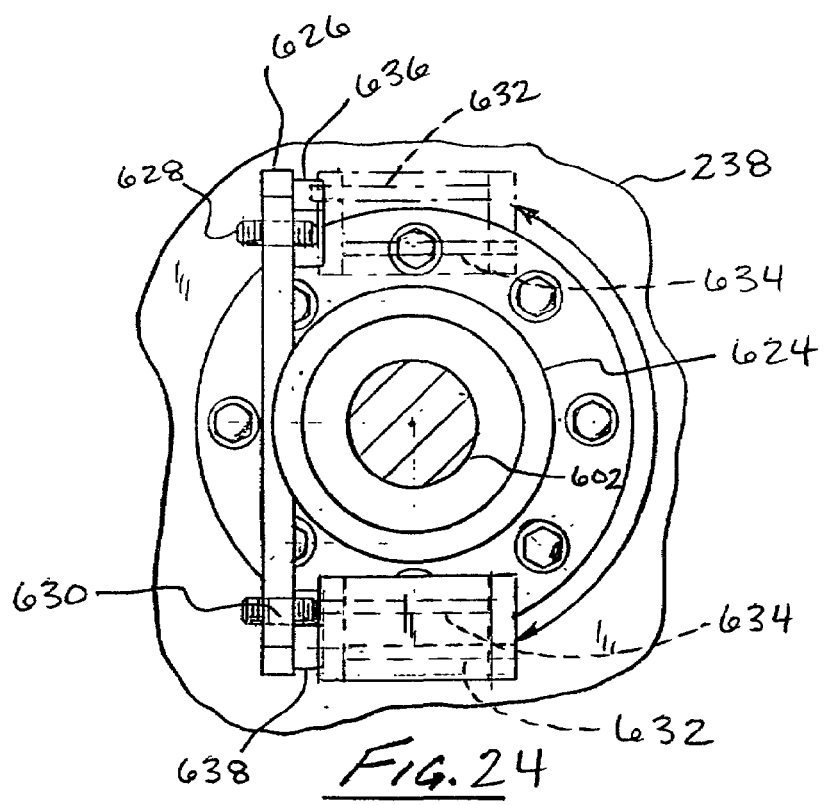
FIG. 24 is a top view of the rotating table illustrating the stop block that limits the rotation of the table and the switches that provide an indication of its position.

FIG. 23 shows the aperture mask in greater detail in perspective view. FIG. 22 shows the aperture mask in cross section in its position over a filter nest 236 during filter loading and unloading. FIG. 22 shows the aperture mask in side view, extending across all four filter nests 236 on one side of table 238. For clarity of illustration, this mask is not shown in the other FIGURES of this application. Nonetheless, all the embodiments of this invention preferably employ this mask to increase the performance of the system by masking off stray environmental light and light scattered from the surface of the filter during testing at the goniometer test stations.

As shown in FIG. 23, the mask is in the form of an elongate bar 2306 that defines several apertures. Table 238 has two such masks 2302. One mask 2302 is disposed across four flexures on one side of the table and the other is disposed across four flexures on the opposite side of the table.

Each of the four flexure locations along the mask defines a plurality of apertures, including (1) a large aperture 2308 sized to pass the tip of probe 152 when it is lowered to the flexure during insertion or removal of filter 196 from the flexure, (2) a small aperture 2304 that is sized to permit the passage of laser light to detector 304 in the goniometer testing position, and (3) an elongate aperture 2310 sized to permit the passage of the beam of laser light for tests conducted with the goniometer disposed at an acute angle with respect to the bottom surface of the filter. According to another embodiment of the aperture mask 2302, the mask may define but a single sized/shaped aperture, such as defining only elongated apertures 2310. This aperture is utilized during all forms of testing. Thus, the aperture mask 2302 does not need to be adjested from test to test, yet still serves its basic function of reducing the transmission of stray light.

The bar also includes two couplings 2312, here shown as two tabs located at and extending outward from either end of bar 2306. These couplings are configured to be coupled to a mating coupling (not shown) that is fixed to plate 502, which is driven side-to-side in the "X" direction by linear motor 510.

Figure 12:
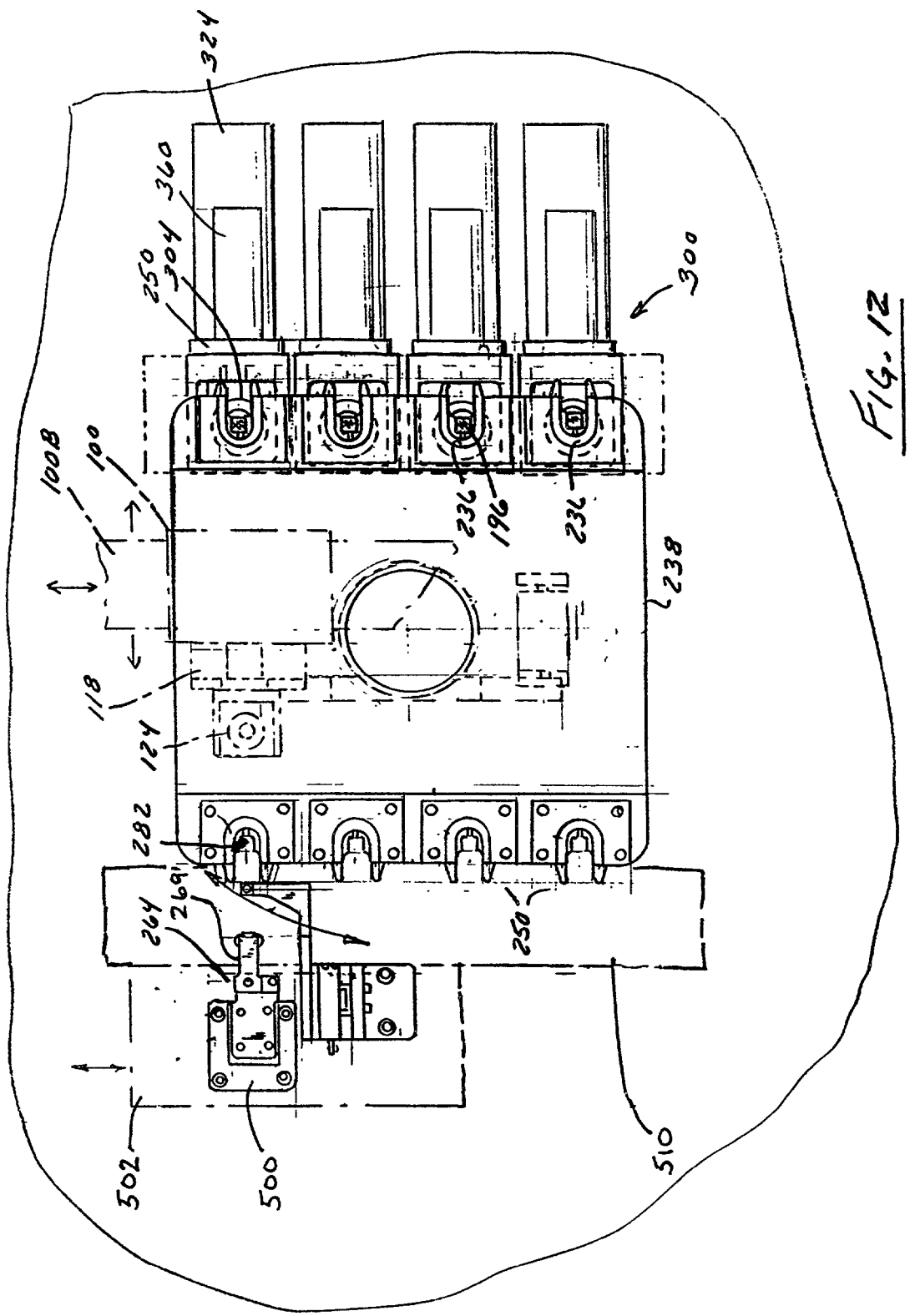
FIG. 12 is a plan view, generally depicting certain elements or components of the invention that are also generally shown in FIGS. 3 and 7.

The mask is fixed to table 238 by two headed fasteners 2314 disposed at each end of the mask. These fasteners are disposed in slots 2316 defined by the mask that are located at either end of bar 2306. As shown in FIG. 12, the two fasteners 2314 are fixed to and extend upward from table 238 at either end of the table.

Slots 2316 receive the fasteners and are sized to permit the fasteners to slide in the slots, or rather, since the fasteners are fixed to the table, to permit the aperture mask to slide side-to-side with respect to the table.

The slots and fasteners are disposed and configured such that the mask can be shifted by linear motor 510 to any one of three positions, yet will hold the mask in each of these positions when table 238 is rotated 180 degrees from the filter loading position to the filter testing position.

A first position of mask 2302 with respect to table 238 is a loading position in which the lower tip portion of probe 152 can pass through all four large apertures 2308 in order to place a filter 196 in each of the flexures during flexure loading and to remove each of the filters during flexure unloading. Thus, once linear motor 510 shifts mask 2302 to the loading position, all four flexures can be sequentially loaded using probe 152 with no necessary intermediate movement of mask 2302 with respect to table 238.

A second position of mask 2302 with respect to table 238 is a testing position in which the laser light beams generated by the four collimators 500 can simultaneously pass through all four small apertures 2304 (the position shown in FIG. 17) and impinge upon the bottom surface of filters 196 at each of the four filter nests. By providing a position of mask 2302 at which all the collimators can reach their filters with their orthogonal laser beams, all the filters can be simultaneously or sequentially tested without having to move mask 2302 between each filter test.

A third position of mask 2302 with respect to table 238 is a second testing position in which the laser light beams generated by the four collimators 500 can simultaneously pass through all four elongate apertures 2310 and impinge upon the bottom surface of filters 196 at each of the four filter nests. By providing a position of mask 2302 at which all the collimators can reach their filters, all the filters can be simultaneously or sequentially tested without having to move mask 2302 between each filter test.

In operation, the linear motor 510 will move laterally until the aperture mask coupling supported by linear motor 510 can engage its mating coupling 2312 on mask 2302. Once engaged, linear motor 510 moves in the "X" direction to slide mask 2302 with respect to table 238. During this process, table 238 does not move, but is held stationary.

Once mask 2302 is moved to the proper location, thereby locating large aperture 2308 at each of the flexures, the coupling on linear motor 510 is disengaged from coupling 2312 on mask 2302. Filter loading and unloading can then begin.

Once a new set of filters-to-be-tested are loaded, however, and before the table 238 (and hence the filters 196) are rotated to locate the filters at their goniometers for testing, the mask is shifted to locate the elongate or small circular apertures in position above the flexures. Once in this position the table is rotated and testing begins.

Alternatively, the mask 2302 may be fixedly mounted so as to be interposed between the optical filter under test and the optical detector 304. Per such an embodiment, the mask 2302 remains stationary, simplifying the testing system.

The mask, while useful, is not necessary to the operation of the other parts of the system. Certainly there are many filters and substrates that may be tested in an automatic fashion without an aperture mask. In addition, each flexure may be provided with an individual mask, although these would require either more time or more actuators to move them. While the mask is operated when the flexures are at their loading stations, a mask actuator could as easily be disposed in the region of the goniometer to move the mask once it is back by the goniometer stations. Alternatively, a fixed or movable mask could be mounted by the goniometer stations that does not rotate with the table.

The following discussion summarizes operation of the optical filter testing and sorting apparatus of the present invention. The apparatus, capable of operating continuously, will pause automatically in response to optical filter availability (input) and take-away (output) constraints as well as for maintenance reasons.

The general overall flow of the filter testing process includes locating a filter on either the tape from the tape frame 111 (or the gel packs/vacuum release trays 702), moving them to and inserting them in the flexures, rotating table 238 until the flexures are located between the collimator and the detector at the four testing stations, testing the filters, rotating the table back to its original position, removing the four filters from the flexures, and inserting them in the output trays 112.

Due to the construction of the machine, there are several of these operations that can be overlapped in time. This overlapping permits the machine to be engaged in several testing operations simultaneously, thus increasing productivity.

For example, loading and unloading can take place at the same time the filters are being tested. Table 238 has eight flexure stations, four on each side of the table, with one set of four in a testing position at the goniometers while the other set of four flexures is facing outward to be loaded or unloaded by the "X", "Y" and "Z" stages. Thus, at the same time the goniometers are performing their tip and tilt adjustments or their scanning of wavelengths, the "X", "Y" and "Z" stages can remove tested filters from the four flexures facing the "X", "Y" and "Z" stages (i.e. the set of flexures that are not located at the goniometer test stations) and replace them with four new filters to be tested.

As another example of additional overlapping functions, the "X", "Y" and "Z" stages can also perform various "housekeeping" functions while waiting for the goniometers to perform their testing. For example, assume the four filters that have been tested have already been removed from the flexures, placed in output trays, and have been replaced with four additional to-be-tested filters in the four flexures that are not at the goniometer test station. At this point the "X", "Y", and "Z" stages may be operated to move trays of tested parts from one area of table 114 to another area of table 114.

As yet another example, the "X", "Y", and "Z" stages can move effector 120 to grasp and move trays of tested filters from the sorting area of table 114 to the depot area (i.e. row 150).

As another example of these housekeeping functions, the "X", "Y" and "Z" stages can pick to-be-tested filters off of the tape frame 111 and place them in the vacuum trays 702. In addition, while testing is occurring at he goniometer stations, effector 120 can pick and place lids that are stacked in depot locations (row 150) or are on top of their corresponding output trays 112 or gel pack trays 702.

As another example of the system's ability to perform multiple operations simultaneously, the system's four goniometers can be operated substantially simultaneously. For example, as one goniometer is adjusted to a proper tip and tilt angle using motors 324 and 360, the other goniometers can be likewise simultaneously adjusted.

As another example, while one goniometer detector is receiving a transmitted light signal from the laser light source, the other goniometer detectors can likewise simultaneously receive the same signal at their detectors.

All of these features are possible due to the arrangement of the system described herein.

Figure 21A:
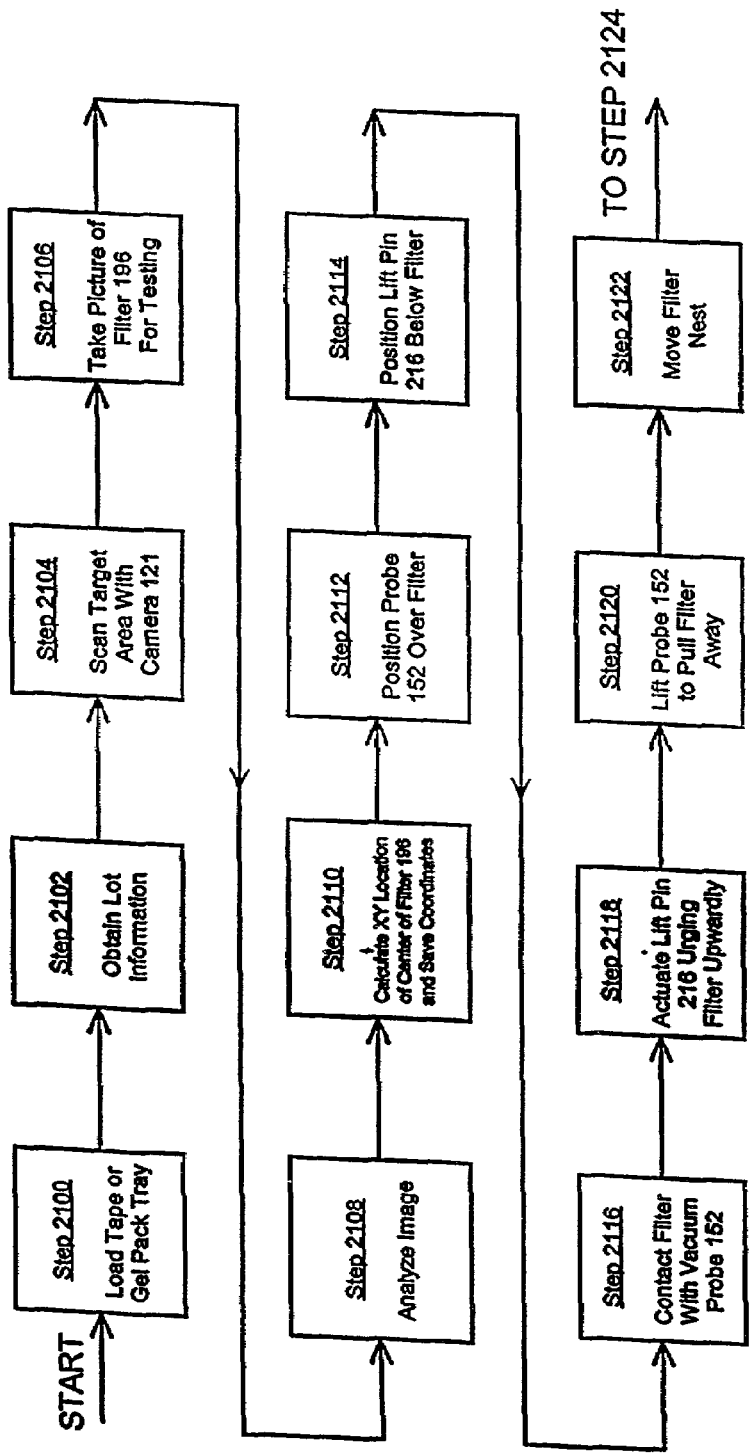
FIGS. 21A, 21B an 21C together provide a flow chart of a preferred method for testing optical filters.
Figure 21B:
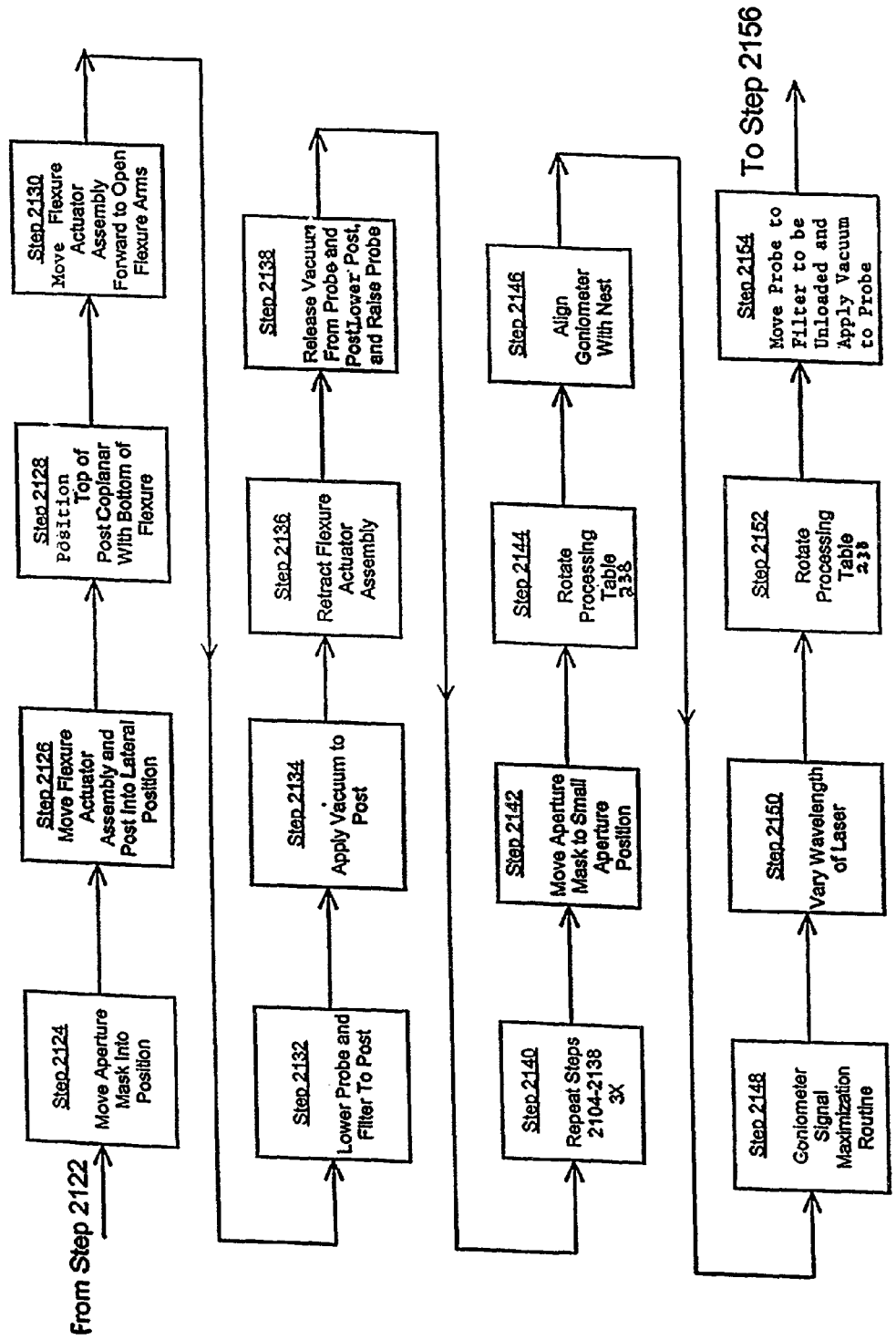
Figure 21C:
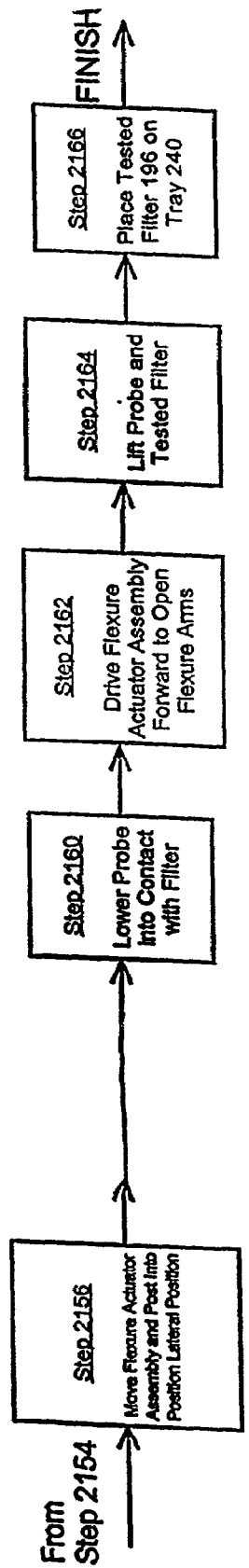

Referring to the flow chart of FIG. 21, at step 2100, a tape frame 111 or one or more gel pack trays 702 are loaded (FIG. 7) into the machine.

At step 2102, lot information representative of the optical filters 196 to be tested (FIGS. 8A and 8B) is preferably either scanned from bar code information associated with the to-be-tested optical filters 196 located on the tape frame 111 or the gel pack trays 702 by a bar code reader (not shown) or is manually entered by the operator into the system's computer.

This lot code information specifies a recipe number that preferably includes (1) the nominal filter-to-filter pitch (both in "X" and in "Y") of the filters, (2) the nominal dimensions of the filters (the thickness, the width and the height of the filters), (3) the nominal location of one filter (the reference filter) with respect to a reference point on the tray itself, (4) the nominal center wavelength of the passband of the filters, and (5) the nominal passband width of the filters.

At step 2104, machine vision camera 121 (FIGS. 7 and 8A) scans the target area for each such optical filter 196. The system moves camera 1212 using the "X" and "Y" stages until the camera is located over the location of the reference filter.

At step 2106, the system takes a picture of the tray at this reference location using camera 121.

At step 2108, the system analyzes the image using the previously entered nominal dimensions of the filter to extract edge characteristics indicative of a filter. If the image processing indicates that an entire filter is within the image (step 2110), the system continues processing at step 2110.

If the system is unable to identify a filter in the image that matches the nominal dimensions of the filter, the system then moves to another location adjacent to the nominal location and repeats the image capture and image processing performed in steps 2106 and 2108.

In the preferred embodiment, the system is configured to move camera 121 in a predetermined path in the vicinity of the reference filter, moving from one predetermined location to another predetermined location until a complete image of a filter is in the camera's (121) field of view. This search path may vary based upon the size of the filter (in particular the width and height of the filter). For larger filters, larger increments of motion are preferably made. For smaller filters, smaller increments of motion may be made.

The preferred path along which the camera is moved in successive attempts to get an image of an entire filter is preferably curvilinear such as a spiral path or a circular path. Starting from the nominal location of the first filter, previously stored in the computer, the camera is moved in an outward spiral. Alternatively it may be moved to a sequence of locations that collectively define several substantially concentric circles.

The system performs this moving, image gathering and image analyzing process at a succession of locations along the path until a filter is ultimately found, at which point processing continues at step 2110.

In step 2110, the system calculates the location of the geometric center of the filter based upon the actual location of the edges of the filter extracted from the image. The system also determines the rotational angle of the filter in the "X" and "Y" planes and about the "Z" axis—the "theta" angle of the filter.

The "X" and "Y" locations of the center of the filter are determined based upon (1) the "X" and "Y" position of the camera (typically the center of the image shown in the camera) and the "X" and "Y" offset of the filter within the camera image. The combination of the "X" and "Y" camera location and the "X" and "Y" offset of the center of the filter within the camera image itself provides the actual "X" and "Y" location of the filter.

In step 2110, the system also saves data indicative of the actual "X" and "Y" location of the center of this reference filter (the "actual reference location") for later use when the system returns to the tray to locate and pick up subsequent filters in the tray.

In step 2112, the system moves the "X" and "Y" stages to position vacuum probe 152 directly above the center of the reference filter. As described above, the camera 121 and the probe 152 are both supported on the "X" and "Y" stages, and are fixed with respect to each other in the "X" and "Y" directions. As a result, they have a fixed "X" and "Y" offset from each other. This offset is electronically stored in the computer, and is used to offset the "X" and "Y" stages to position the probe directly over the center of the filter.

At substantially the same time that the "X" and "Y" stages move the probe 152 into position in step 2114, the system also moves the "X" and "Y" stages (on which the lift pin assembly in mounted) to position the lift pin directly underneath the actual center of the filter. While the positioning of probe 152 and the lift pin assembly may be done sequentially, it is preferably that they move simultaneously in order to reduce the overall cycle time of the system. Since one feature of the preferred embodiment of this invention is to locate the pin and the probe on separate "X" and "Y" translatable stages, the present system is capable of simultaneous positioning of both the probe and the pin.

Once the center of the probe reaches the center of the filter in question, it is lowered until it just contacts the filter in step

2116. In the preferred embodiment, the system also applies a vacuum to probe 152 to adhere the filter to the bottom of the probe.

In step 2118, the system raises the lift pin, now in position under the filter, by applying compressed air to cylinder 206 until the filter is lifted a predetermined distance. The system monitors the signal from sensor 228 to determine when the lift pin has been raised to the proper height. As described above, this driving upward of the filter against probe 152 is accompanied by the step of peeling a portion of the tape away from the filter, thus leaving the filter stuck to a small portion of the tape.

As a reminder, not every filter to be tested is held on the adhesive tape on tape frame 111. Some filters to be tested are located in gel packs 702 on vacuum mounts 700. In the case where filters are held in gel packs, the process is slightly different. When gel packs are used, the lift pin assembly is not used to help release the filters, and thus the steps above related to moving and positioning the lift pin assembly are not performed. Indeed, the entire lift pin process may be eliminated if the adhesive to which the filters are held is of a sufficiently low tackiness that it will release the filters by the vacuum applied to probe 152 alone. New adhesives and packaging methods for filters will no doubt be developed that may permit the elimination of the lift pin assembly.

Gel packs are formed of a plastic tray over which a thin flexible matrix is attached. The matrix is formed of a tacky gel material. The filters are stuck to this matrix. Between the matrix and the inside bottom of the tray is an irregular grid. This grid may be in the form of a woven mat. A vacuum is applied to the bottom side of the gel pack, shown in FIG. 2A, causing the matrix to be pulled downward and into close contact with this irregular grid. This happens because the vacuum pulls air out from between the irregular surface and the planar matrix. The irregular grid does not flatten out, however. The gel matrix assumes an irregular bumpy surface to match the irregular grid.

When the matrix is distorted downwardly, portions of the matrix are pulled away from the bottom surface of each of the filters stuck to the top surface of the matrix. The bottom surfaces of the filters generally contact an equal area of adhesive coated matrix before the vacuum is applied. When the vacuum is applied and the matrix deforms downwardly curving and conforming to the grid, at least a portion of the adhesive-coated matrix pulls away from the back of the filters. This pulling away causes all of the filters in the gel pack to be in contact with a smaller area of sticky gel, and thus to be held more weakly to the matrix than they are when no vacuum is applied and the matrix is in its normally flat planar orientation.

As a result, when the system applies a vacuum to the gel pack using the arrangement shown in FIG. 2A, the system provides a reduction in surface contact area that is similar to the reduction in adhesive bond area provided by operation of the lift pin, but without the lift pin assembly apparatus, and merely by the application of a vacuum to the gel pack.

All that is required is a tray mount that is configured to receive the gel pack and the application of a vacuum to the underside of a gel pack. This capability is provided by mounts 700 illustrated in cross-section in FIG. 2A, shown in FIGS. 1 and 2, and discussed above.

Referring back to the process, in step 2120, the system lifts probe 152 by commanding the "Z" stage to raise, thereby pulling (by the vacuum applied to probe 152) the filter away from the remaining portion of the tape to which the filter is adhered. Alternatively, the probe retracts from the gel pack and similarly pulls the filter away from the gel matrix.

If the probe 152 is retrieving filters from a gel pack, the step of applying a vacuum to the gel pack is performed just before step 2118 in order to reduce the surface contact between the filter and the gel pack. This insures that the probe is capable of pulling the filter free from the gel pack in step 2118. Applying vacuum after step 2106 also assures a higher quality image of the filter when the image of the filter is acquired.

Once removed from the tape, the "X" and "Y" stages translate the filter on the end of the probe to the flexures in step 2122. Each flexure has a predetermined X–Y location stored in the computer, expressed either as an absolute location or as an offset from a predetermined reference location, that is accessed by the system's computer to provide the X–Y location of each flexure to the system.

During the process of translating the filter, the system also commands the "theta" stage to rotate the filter to a proper graspable position. In the preferred embodiment, this position is one that will permit the three protrusions 283, 284, 286 on the arms of flexure 250 to effectively grasp the filter when the system retracts the flexure actuator assembly and thereby releases the flexure arms 262.

In the preferred embodiment, the system determines the rotational angle of the filter based upon the electronic image received from camera 121, as described above in step 2106. This angle indicates the rotational position of the filter in its tray, and with respect to the "X" and "Y" axes of the system.

The system retrieves the "theta" or rotational angle of the filter about the "Z" axis. This value was calculated during step 2110 above in which the filter was identified and its center calculated.

The system then converts the theta angle into a drive signal that is applied to the theta stage. In response to this signal, the theta stage rotates through an angle that is calculated to align the filter with its intended flexure. Once the proper filter angle has been achieved, the theta stage stops rotating.

This rotation can occur at any time between the time the filter has been picked up by probe 152 at step 2120 and the time that the flexure arms are released to grasp that same filter. In the preferred embodiment, this theta rotation is effected as the filter is translated by the "X" and "Y" stages to the desired flexure.

Before the filter that the "X" and "Y" stages are moving to a flexure can be inserted into that flexure, table 238 must first be prepared by moving the aperture mask into the proper position. This occurs in step 2124.

To permit loading, the aperture mask must be shifted to located the large apertures just above gap 282 in which the filters are inserted. The system translates the linear motor 510 until its coupling engages coupling 2312 on the aperture mask. Once engaged, linear motor 510 moves in a direction and for a distance that aligns all four of the large apertures underneath each of their corresponding flexures.

Since a single manipulation of the aperture mask moves all four large apertures simultaneously into position at their flexures, this step only occurs once during flexure loading.

In step 2126, the flexure actuator assembly and the post assembly are moved into lateral position at the flexure that will receive the filter suspended from probe 152. Linear motor 510 moves plate 502 until the flexure actuator assembly, is located directly in front of and between the two arms of the flexure. In this position, post 512 is also located directly below the flexure.

In step 2128, the system prepares the flexure to receive the filter. As part of this preparation, the system drives post 512 upward by applying compressed air to stage 520. Stage 520 moves post 512 upward until the top surface of post 512 is substantially coplanar with the bottom planar surface of flexure 250. After the post is positioned, in step 2130 the system drives flexure actuator 294 forward by applying compressed air to pneumatic stage 266. This forward motion of stage 266 separates the flexure arms.

The system then inserts filter 196 into the flexure. In step 2132, the system commands the "Z" stage to lower probe 152 a predetermined amount that will locate filter 196 between the arms of the flexure and place it in contact with the top of post 512.

In the preferred embodiment, the system drives the "Z" stage downward to a position at which probe 152 is slightly compressed in its sleeve, the guaranteeing that the filter will be mechanically held between and in contact with both the post and the probe by their contact with opposing planar sides of the filter.

The system then applies a vacuum to post 512 to hold the filter in step 2134. Once the vacuum has been applied to the post and the system determines (using a vacuum sensor) that the vacuum has been applied, the system removes the vacuum from the probe. The system then determines (based upon a vacuum sensor disposed to sense the probe vacuum) that the vacuum has been removed and drives the "Z" stage (and therefore probe 152) upward away from the filter nest to permit completion of flexure loading (in step 2138).

The system then retracts the flexure actuator assembly in step 2136, thereby releasing the flexure arms, and permitting the flexure arms to move inwardly and mechanically engage the filter. The system then releases the vacuum applied to post 512, and drives stage 520 downward to lower post 512 away from the filter.

Once a single flexure has been loaded, the system repeats the process of steps 2104-2138 three more times as indicated by step 2140 (with the exception of the step of shifting the aperture, which is not repeated at each successive filter placement) until all four apertures are loaded.

At the conclusion of this loading process, the system moves aperture mask 2302 in step 2142 using the process described above in conjunction with step 2124. The system commands linear motor 510 to move the aperture mask to either of its two testing positions, depending upon the particular tests that the system will perform on the filters.

Once four untested filters are mounted in their corresponding flexures and the system has completed its optical testing of four filters previously loaded into the machine and located at the test stations, the tested filters are moved away from the test stations and the four just-loaded filters are moved into position at the test stations. This happens in step 2144.

The system then rotates table 238 by applying compressed air to one of the two opposed cylinders 612. This causes shaft 602, and hence table 238 to begin rotating. The system applies air to the appropriate cylinder 612 until stop block 640 on the bottom of table 238 abuts one of adjustable stops 628.

At substantially the same time this abutting occurs, one of optical limit switch flags 632 or 634 (depending upon which of the two opposed 180 degree positions the table is being driven to) causes its corresponding sensor 636 or 638 (again, depending upon the position the table is driven to) to generate a signal indicating that the table has rotated 180 degrees. The air pressure the cylinder holds the table in position against adjustable stop 628 or 630 (again, depending upon the rotational position of the table). Note that this process is reversed using the other one of cylinder 612 and the other one of the two limit switches and flags when the table is moved back to its original position after testing.

Once the table 238 has been rotated in step 2144, as indicated by sensor 636 or 638, the four to-be-tested filters are now at their corresponding goniometer test stations and the system begins optical testing. Note also that, at the same time the table rotated four filters into position for testing, it simultaneously moved the four filters on the opposite side of the table into position for unloading and sorting by probe 152.

At step 2146, the system optically aligns each goniometer 302 with a corresponding nest 236 (FIGS. 12 and 14) by selectively driving motors 324 and 360.

At step 2148, the system controls goniometer 302 and performs a signal maximization routine to determine signal as a function of angular position. The system positions each goniometer 302 at the angular position that generated peak intensity (normal incidence).

At step 2150, the system varies the wavelength of the tunable laser and tests for the transmission characteristics of each filter.

After filter testing, at step 2152, the processing table 238 again rotates 180° presenting a new set of optical filters 196 for testing (FIGS. 12 and 14) and returning the tested optical filters 196 to their original position adjacent to linear motor 510 (FIGS. 3 and 12) for further processing.

At step 2154, the system drives the "X" and "Y" gantry systems (FIGS. 1 and 2) to move the head 124 (FIGS. 5A and 5B) over the first tested filter to be unloaded.

At step 2156 the system drives linear motor 510, and hence the flexure actuator assembly 294 laterally into a position adjacent a filter nest.

At step 2160, the system drives the "Z" stage downward causing vacuum probe 152 to make contact with that filter, and applies a vacuum to orifice 164.

At step 2162, the system applies compressed air to translating stage 266 thereby causing flexure actuator assembly 264 to translate and spread jaws 262 and thereby releasing the first tested filter 196 to the vacuum probe 152 (FIGS. 9A and 9B) of the head 124.

At step 2164, the system deposits the tested filter in the appropriate output tray. The system commands the "X" and "Y" stages to move the tested filter to a predetermined empty filter position over the appropriate output tray 112 (based upon the results of the test) and then commands the "Z" stage to lower the filter on the end of probe 152 until it is in position on the tray. Once in position, the system releases the vacuum applied to probe 152 and commands the "Z" stage to translate upward away from that tray.

This process of unloading described in steps 2154 through 2164 is repeated four times, once for (and at) each of the four filter nests 236 containing a tested filter.

While the loading and unloading process described above indicates that all four tested filters are unloaded from the flexures before four to-be-tested filters are loaded into the flexures, this is not necessary. It is equally satisfactory (and considered to be within the scope of this invention) to interleave the unloading and loading. When the loading and unloading processes are interleaved, each of the four filter nests is sequentially unloaded and loaded in turn.

What has been illustrated and described herein is an automated apparatus for testing optical filters. However, as the automated apparatus of the present invention has been illustrated and described with reference to several preferred embodiments, it is to be understood that the full scope of the invention is not to be limited to these embodiments. In particular, and as those skilled in the relevant art can appreciate, functional alternatives will readily become apparent after reviewing this patent specification and enclosed FIGURES. Accordingly, all such functional equivalents, alternatives, and/or modifications are to be considered as forming a part of the present invention insofar as they fall within the spirit and scope of the appended claims.

What is claimed is:

1. In a parts handling system including a translatable parts-handling device and a vision system that includes an electronic camera, wherein the parts handling system is configured to translate the camera to the vicinity of a part, takes an electronic picture of the part, and, based upon the location of the part extracted from the picture and offset position data indicative of the offset between the camera and parts-handling device, move the parts handling device into position for handling the part, a method of calibrating the vision system to the parts handling device comprising:
    positioning a camera over a corner of a touch-off block;
    recording a first set of position data of the corner relative to the position of the camera;
    moving the parts-handling device into contact with a first surface of the touch-off block;
    recording a second set of position data indicative of an actual position of the parts-handling device-when in contact with the first surface; and
    using the second set of position contact data in subsequent parts-handling operations.

2. The method of claim 1, further comprising:
    moving the parts handling device-into contact with a second surface of the touch-off block;
    recording a third set of surface position data indicative of another actual position of the parts-handling device when in contact with the second surface; and
    using the third set of position contact data in the subsequent parts-handling operations.

3. The method of claim 2, wherein the first and second surfaces are orthogonal to each other.

4. The method of claim 3, further comprising:
    calculating two orthogonal position offsets of a parts-handling device-position with respect to the camera position based upon the first, second, and third sets of position data.

5. The method of claim 1, further comprising:
    rotating the parts-handling device through a first predetermined angle;
    moving the parts-handling device into contact with the first surface of the touch-off block;
    recording a second set of surface position data indicative of an actual position of the parts-handling device when in contact with the first surface after rotation; and
    using the second set of surface position contact data in subsequent parts-handling operations.

6. The method of claim 5, further comprising:
    calculating a position offset in a first direction normal to the first surface, the position offset expressed as a function of a rotational angle of the parts-handling device.

7. The method of claim 5, wherein the first predetermined angle is substantially 90 degrees.

8. The method of claim 5, further comprising:
    rotating the parts-handling device through a second predetermined angle;
    moving the parts-handling device into contact with the first surface of the touch-off block;
    recording a third set of surface position data indicative of an actual position of the parts-handling device when in contact with the first surface after rotation;
    rotating the parts-handling device through a third predetermined angle;
    moving the parts-handling device into contact with the first surface of the touch-off block;
    recording a fourth set of surface position data indicative of an actual position of the parts-handling device when in contact with the first surface after rotation; and
    using the third set of surface position data and the fourth set of surface position data in subsequent parts-handling operations.

9. The method of claim 8, further comprising:
    combining the first, second, third and fourth set of surface position data to determine a fixed offset and a relative offset determined as a function of a rotational position of the parts-handling device.

* * * * *